(12) United States Patent
Spacek

(10) Patent No.: US 9,772,608 B2
(45) Date of Patent: Sep. 26, 2017

(54) OIL WELL IMPROVEMENT SYSTEM—WELL MONITOR AND CONTROL SUBSYSTEM

(71) Applicant: Joe Spacek, Brant Lake, NY (US)

(72) Inventor: Joe Spacek, Brant Lake, NY (US)

( * ) Notice: Subject to any disclaimer, the term of this patent is extended or adjusted under 35 U.S.C. 154(b) by 0 days.

(21) Appl. No.: 14/720,911

(22) Filed: May 25, 2015

(65) Prior Publication Data

US 2015/0337642 A1 Nov. 26, 2015

Related U.S. Application Data

(63) Continuation-in-part of application No. 13/330,668, filed on Dec. 19, 2011, now Pat. No. 9,085,950.

(60) Provisional application No. 61/459,895, filed on Dec. 20, 2010.

(51) Int. Cl.

| | | |
|---|---|---|
| *E21B 44/00* | (2006.01) | |
| *G05B 9/02* | (2006.01) | |
| *E21B 17/00* | (2006.01) | |
| *E21B 47/12* | (2012.01) | |
| *E21B 47/00* | (2012.01) | |
| *E21B 29/00* | (2006.01) | |
| *E21B 33/037* | (2006.01) | |
| *E21B 33/06* | (2006.01) | |
| *E21B 43/01* | (2006.01) | |
| *E21B 17/046* | (2006.01) | |

(52) U.S. Cl.
CPC .............. *G05B 9/02* (2013.01); *E21B 17/003* (2013.01); *E21B 17/046* (2013.01); *E21B 29/007* (2013.01); *E21B 33/037* (2013.01); *E21B 33/06* (2013.01); *E21B 43/0122* (2013.01)

(58) Field of Classification Search
CPC ...... E21B 44/005; E21B 47/00; E21B 47/123; E21B 17/003; E21B 34/066; E21B 44/00; E21B 33/0355

See application file for complete search history.

(56) References Cited

U.S. PATENT DOCUMENTS

| | | | | |
|---|---|---|---|---|
| 3,807,502 A | * | 4/1974 | Heilhecker | ........... E21B 17/003 166/385 |
| 4,001,774 A | * | 1/1977 | Dawson | ................ E21B 17/003 174/47 |
| 4,051,456 A | * | 9/1977 | Heilhecker | ............. E21B 47/12 175/104 |

(Continued)

*Primary Examiner* — James G Sayre

(57) ABSTRACT

This subsystem is an element of an oil well improvement (disasters preventive) system for offshore wells. This subsystem modifies existing in-well; data transmission equipment, data formatting & processing, and further modifies the processing of the existing sensors and remote controlled devices to provide enhanced capacity, reaction time & reliability for dynamically monitoring & controlling in-well resources. This sensor data and controlled tool status is further integrated into a single data base along with all seabed & platform devices and all related information (formation survey, drill plan, etc). The subsystem processes this data and develops instant status of operational conditions and provides recommendations/alerts/automated controls. Although the primary objective of the subsystem focuses on reducing/eliminating the disastrous effects of blowout, the subsystem also provides the means to alter/improve the normal/uneventful well drilling processes.

9 Claims, 20 Drawing Sheets

Pipe Joint - FO Passive/Active Redundant

(56) References Cited

U.S. PATENT DOCUMENTS

| | | | | |
|---|---|---|---|---|
| 4,215,426 | A * | 7/1980 | Klatt | E21B 17/003 175/40 |
| 6,439,324 | B1 * | 8/2002 | Ringgenberg | E21B 17/003 166/242.6 |
| 6,828,547 | B2 * | 12/2004 | Tubel | E21B 47/00 166/250.01 |
| 8,588,619 | B2 * | 11/2013 | Peter | H04B 10/801 398/105 |
| 8,708,052 | B2 * | 4/2014 | Radi | E21B 19/004 166/250.01 |
| 9,580,973 | B2 * | 2/2017 | Johnson | E21B 17/028 |
| 2002/0062992 | A1 * | 5/2002 | Fredericks | E21B 47/00 175/40 |
| 2003/0010500 | A1 * | 1/2003 | Smith | E21B 47/0001 166/336 |
| 2004/0104797 | A1 * | 6/2004 | Hall | E21B 17/028 336/132 |
| 2005/0096846 | A1 * | 5/2005 | Koithan | E21B 19/165 702/6 |
| 2007/0035413 | A1 * | 2/2007 | Uitto | E21B 47/00 340/853.1 |
| 2011/0044697 | A1 * | 2/2011 | Peter | H04B 10/801 398/140 |
| 2012/0139747 | A1 * | 6/2012 | Papouras | E21B 47/00 340/853.2 |
| 2013/0278432 | A1 * | 10/2013 | Shashoua | G01V 3/18 340/853.7 |

\* cited by examiner

Independent Data Cable

Drill Pipe Data Cable

Mud-Pulse Telemetry

Modified Mud-Pulse Telemetry

Pipe Joint - Mechanical

Pipe Joint - Electrical Contact

Pipe Joint – Inductive Coupling

Pipe Joint – Fiber Optics

Pipe Joint - FO Passive/Active Redundant

External Coupling Device

FO Active Coupling / Amplifer

FO Slip Ring Coupling Device

FO Sensor Digital Interface

FO Controlled Tool Digital Interface

Mud-Pulse Telemetry Sensor Digital Interface

Mud-Pulse Telemetry Tool Controlled Digital Interface

Where a = The System Sync Code *
b = The Device's Unique Address Code *
b' = The Controlled Tool's Command Code *
c = The Time to Report the Device's Data / Status **
c1 - cn = Sequential Reporting of Different Device's Data **
d = The System's Commanded Reset Code *

* Input Control from the Platform's System
    ** Outputs from the Sensors / Controlled Tools Digital Timing Sequence Remote Monitor & Control Subsystem Controlled Check Valve Pipe Coupling / De-Coupling Device

OIL WELL IMPROVEMENT SYSTEM—WELL MONITOR AND CONTROL SUBSYSTEM

CROSS-REFERENCE TO RELATED APPLICATIONS

The present utility patent application claims the benefit of provisional application No. 61/459,895 filed Dec. 20, 2010.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to disaster prevention system for offshore oil wells and in particular to a supplemental disaster preventive system to provide means to insure human, equipment and environmental safety and associated cost avoidance during the offshore well drilling process under all conceived/feasible accidents/failures conditions. The overall system design concept, related procedures/processes and many associated system components to provide major cost reduction benefits for the entire life cycle (drilling, completion, production and abandonment) for both accident/failure and normal/uneventful operations.

2. Description of Related Art Including Information Disclosed Under 37 CFR 1.97 and 1.98

Shortly after the 2010 offshore oil well catastrophe in the Gulf of Mexico, it became obvious that British Petroleum (BP), the entire oil industry, and/or the US Government were unprepared to effectively stop the gushing oil or the means to clean it up.

Throughout the first two plus months of the disaster numerous re-sealing, capturing, clogging, killing and capping techniques were unsuccessfully attempted and several high risk/cost 'normal' well drilling processes were brought to light.

The successful 20 July re-seal, capture and cap 'Rube Goldberg'/'Kluge' (said with admiration) was a simplistic but effective temporary solution for the catastrophic symptoms of the problem—where the primary operative phrase is 'temporary solution for the catastrophic symptoms'.

The enormous somewhat/sometimes unquantifiable costs of the (or of a future) incident includes:
Human Life
Environment
Drilling platform Well (the equipment and the associated labor and its potential production) Equipment and labor associated with the numerous re-seal, capture, and cap 'quick fixes' Equipment and labor associated with the relief/kill wells Gulf clean-up Tourist and fishing industry Local community Public opinion relating to the oil industry and the government Nation and international financial markets The prior art 'blowout prevener' (BOP) is intended to close off the well in case of an uncontrolled/emergency condition (blowout). It's a multi mega-buck, multi-ton device installed on the seafloor having various means/methods, with the design intent of closing a well. The most technically difficult is if/when a pipe and/or pipes (drill, casing, etc.) are within the well. The BOP must 'ram' through the pipe(s) and close off the well. That seems difficult, but add the extreme water pressure and low temperatures, the more extreme oil pressure and high temperatures and the prior art BOP is likely not going to work. After the Macondo's well was finally closed, the BOP was pulled up and evaluated—it was functional but did not do the job.

As offshore oil drilling/production continues in the future it seems only rational that the government as well as oil industry itself would demand, as a prime priority the development of improved equipment/systems and processes.

Whatever the cause(s) (human neglect/error, equipment failure, etc.) of the 2010 oil well disaster and whatever means are developed to insure no such similar failure and/or related impacts reoccurs, there are potentially more likely and more damaging events—specifically natural disasters and (accidental or deliberate) human intervention that must also be addressed.

The focus of the 'quick fix' was to stop/control the symptoms of the immediate catastrophe—the gushing oil.

What is needed is an overall systems design and implementation approach that provides the means to reduce/eliminate the causes and impacts of any conceived/realistic threats to oil wells in the future and further provides more reliable, practical and cost effective means to accomplish the oil well drilling task.

BRIEF SUMMARY OF THE INVENTION

The primary design objective of the present invention was to provide an offshore oil well improvement system using an overall systems design and implementation approach that provides the means to reduce/eliminate the causes and impacts of any conceived/realistic threats to oil wells in the future and further provide more reliable, practical and cost effective means to accomplish oil well drilling.

As the present invention design evolved it became apparent that many related procedures/processes and many associated system components provide major cost reduction benefits for the oil well's entire life cycle (drilling, completion, production and abandonment) in either problem or normal operations.

The present invention is composed of two functional and physically integrated subsystems, the Multi-Function Well Subsystem (MFWS) and the Intrusion Detection and Response Subsystem (ID&RS).

The MFWS is presented in two basic configurations, the 'Fundamental' & the 'Advanced'. Both configurations modify the sea-floor and in-well equipment to provide maintenance access and unique tools to provide the means to: cap the well, seal/re-seal the well, drill/re-drill the well, kill the well from the top, improve BOP reliability, add BOP functional redundancy, improve the cementing process, incorporate a sea-floor pressure relief/diversion function and improves the well's life cycle safety.

The Advanced MFWS includes a unique dome top cylindrical sidewall structure enclosing the well's sea-floor equipment providing improved structural strength as well as passive protection from natural/human induced disasters.

The ID&RS provides the means to detect, track and classify the 3D aspects of air/surface/sub-surface objects about a specific oil well or group of oil wells and provides the means to evaluate and eliminate threats.

As all elements are based on existing simplistic proven technology, the development cost risk is minimum.

As the system design includes a major focus on the physical implementation and operation, the implementation and operational cost risk is minimum Considering the pure human and environmental safety, the pure dollar and cents (or multi-million/billion dollar) cost avoidance and/or the potential cost savings/reductions (for any or all such reasons) it is a significant understatement to suggest that features of the present invention should be integrated with other planned improvements, and incorporated on all oil wells.

BRIEF DESCRIPTION OF THE SEVERAL VIEWS OF THE DRAWINGS

These and other details of the present invention will be described in connection with the accompanying drawings, which are furnished only by way of illustration and not in limitation of the invention.

The drawings are intended to provide an introductory overview of major system/system elements that along with other unique system supporting devices are comprehensively defined in the 'Detailed Description Of The Invention'.

FIGS. 1B and 1D support the description of the proposed subsystem.

FIG. 1A depicts an independent data cable interface. The sensor and control data cable (1) is shown extending from a processor and monitor unit (5) to the sensor (2), passing through the drill platform (4), the drill pipe return (8), the seabed drilling equipment (3), the stud (9), the drilled well bore (7) and the casing (6) and passing by the sea surface (10) and the seabed (11).

The primary affective use of this configuration is in obtaining/verifying down-well formation conditions.

Although the data line is capable of bandwidths well beyond any present or projected need, the configuration is not compatible with dynamic drilling and it is operationally costly (the drill bit & the entire drill pipe run must be extracted for the sensor to access the bore).

Figure 1A:
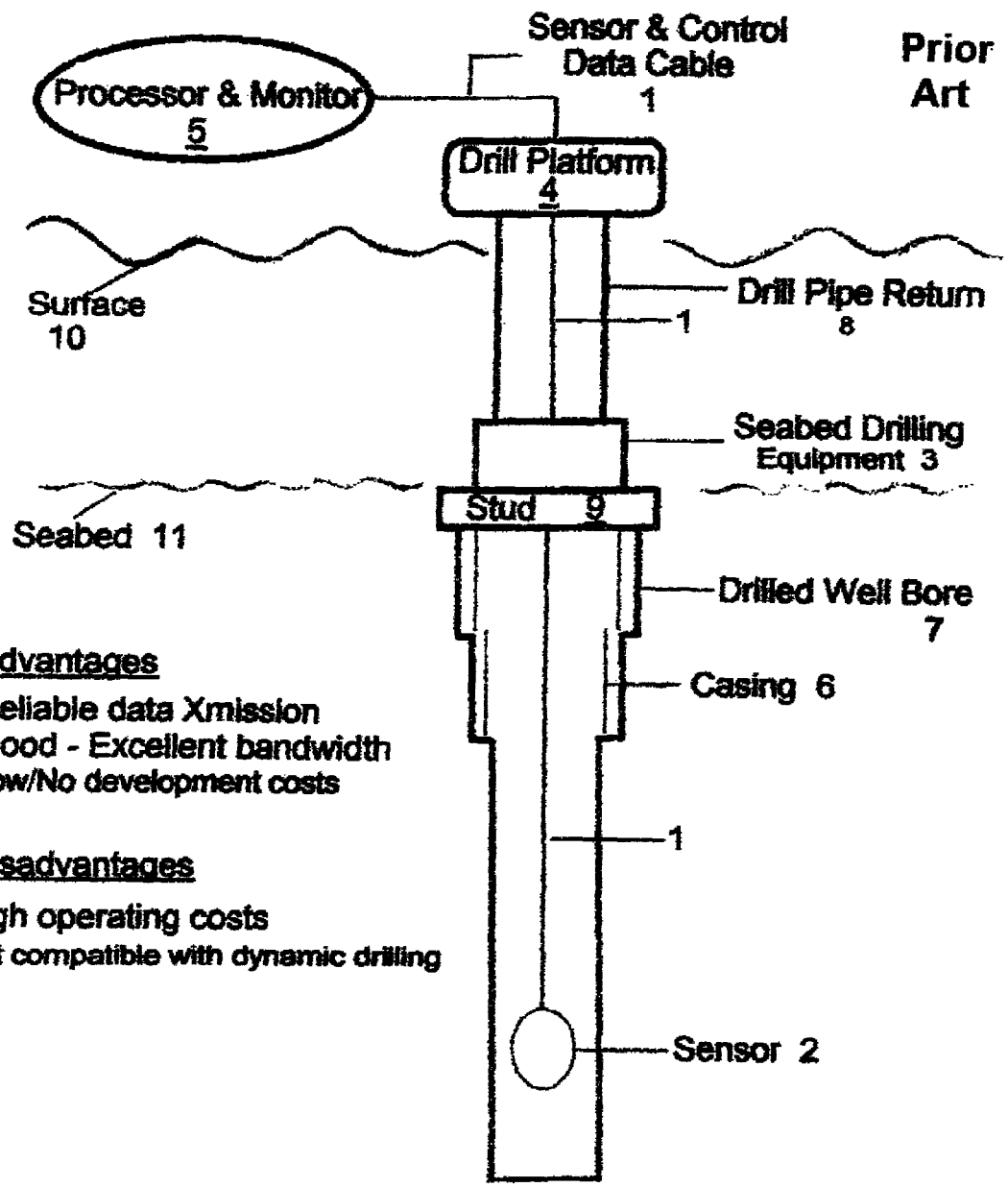
FIGS. 1A through 1C present an overview of existing in-well monitoring and control interface devices. These are presented as background supporting rationale of the proposed subsystem.
Figure 1B:
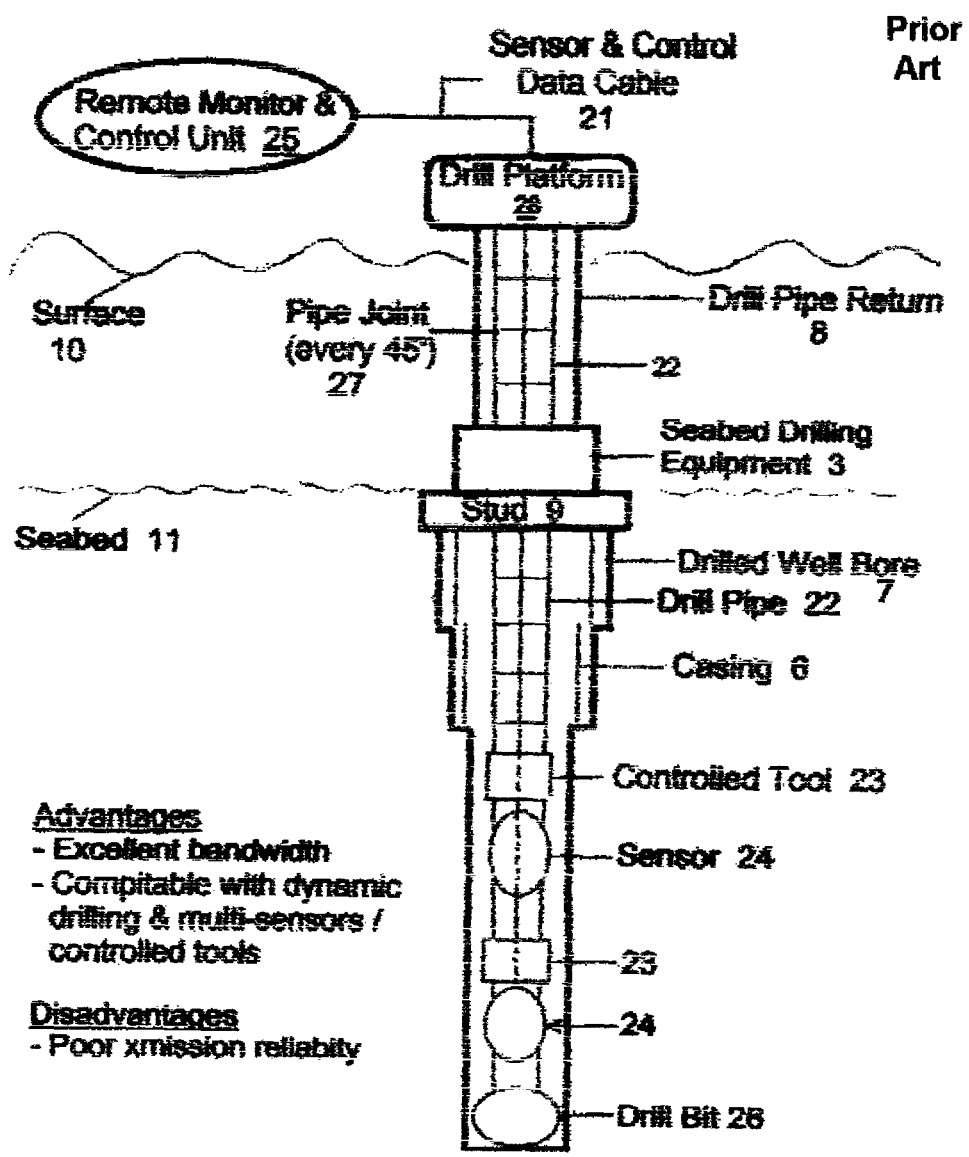

FIG. 1B depicts a basic overview of a drill pipe data cable interface. The sensor and control data cable (21) is physically attached/embedded in/on the drill pipe and the sensor (24) and controlled tool (23) devices are coupled to the data cable. The data cable could be an electrical or fiber optics conductor.

Figure 2A:
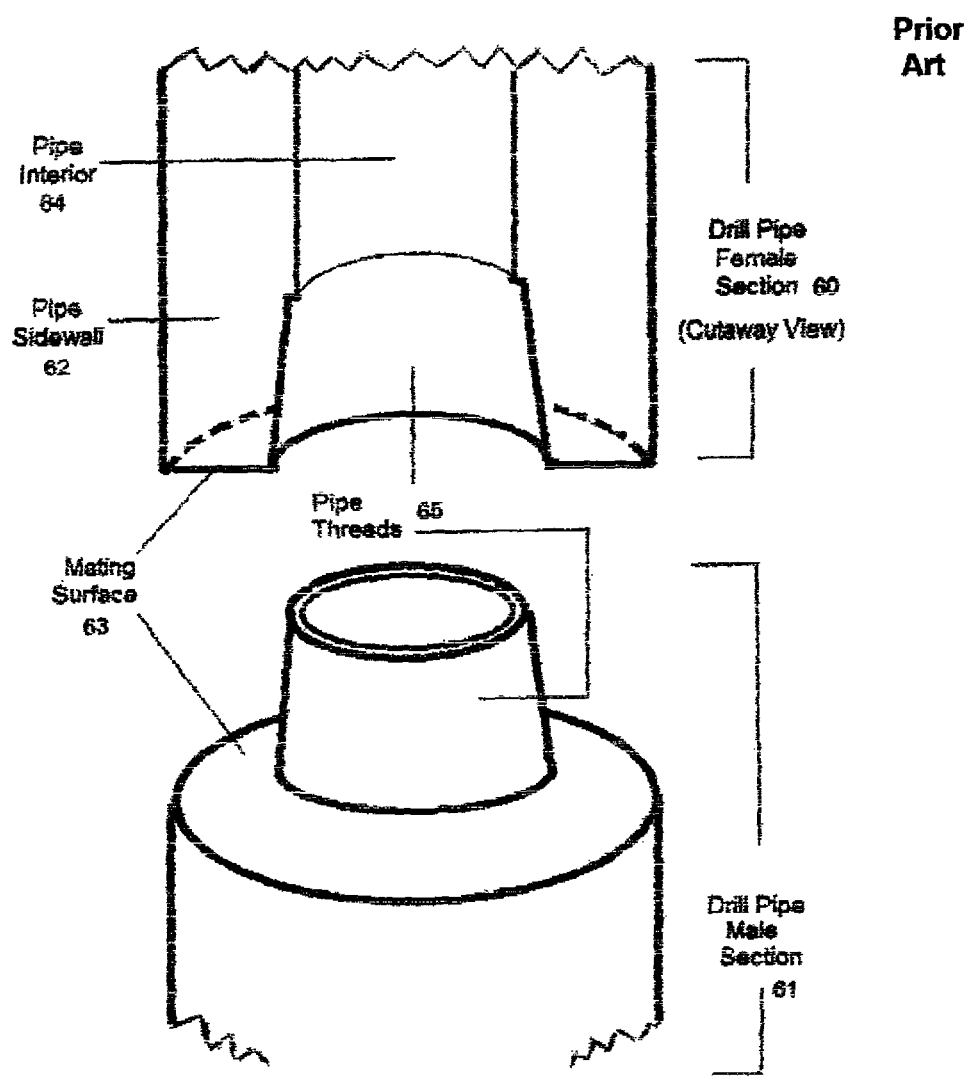
Figure 2:
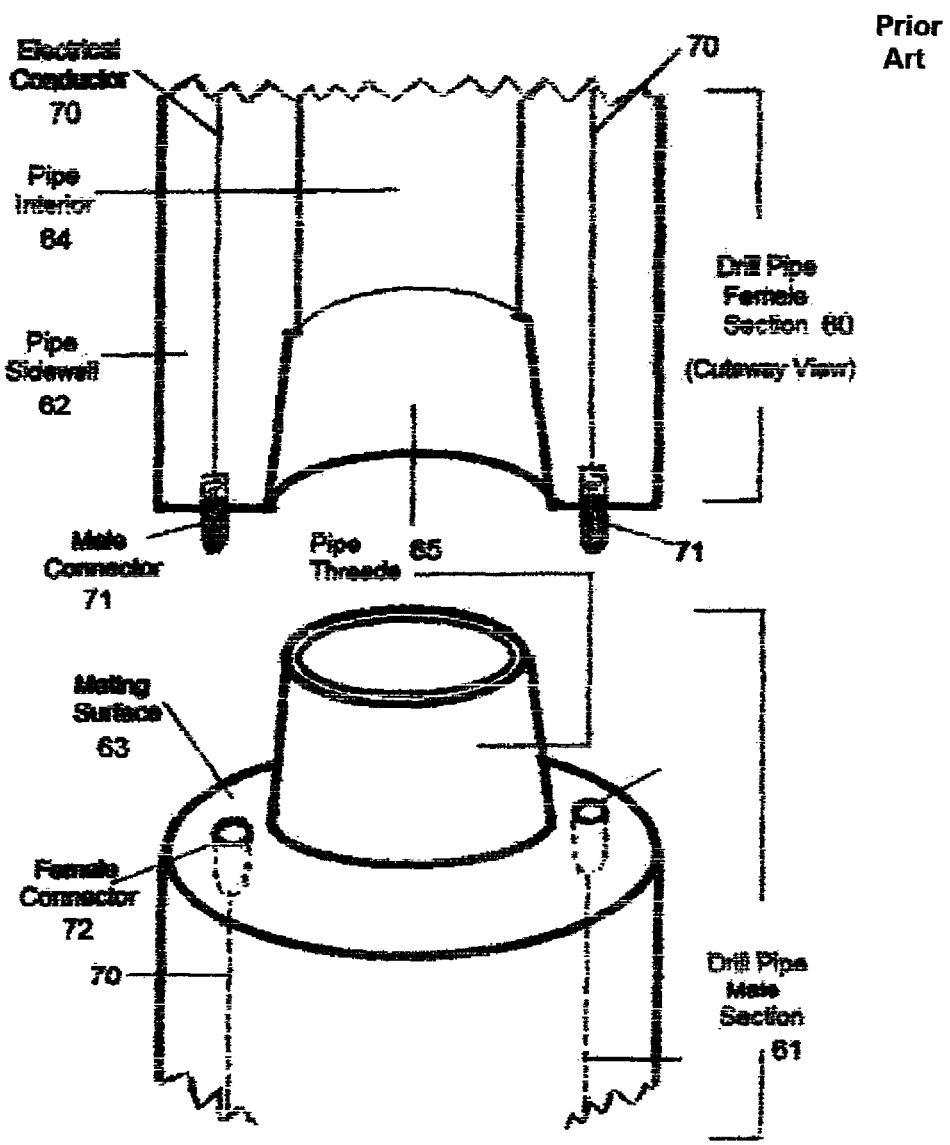
Figure 2:
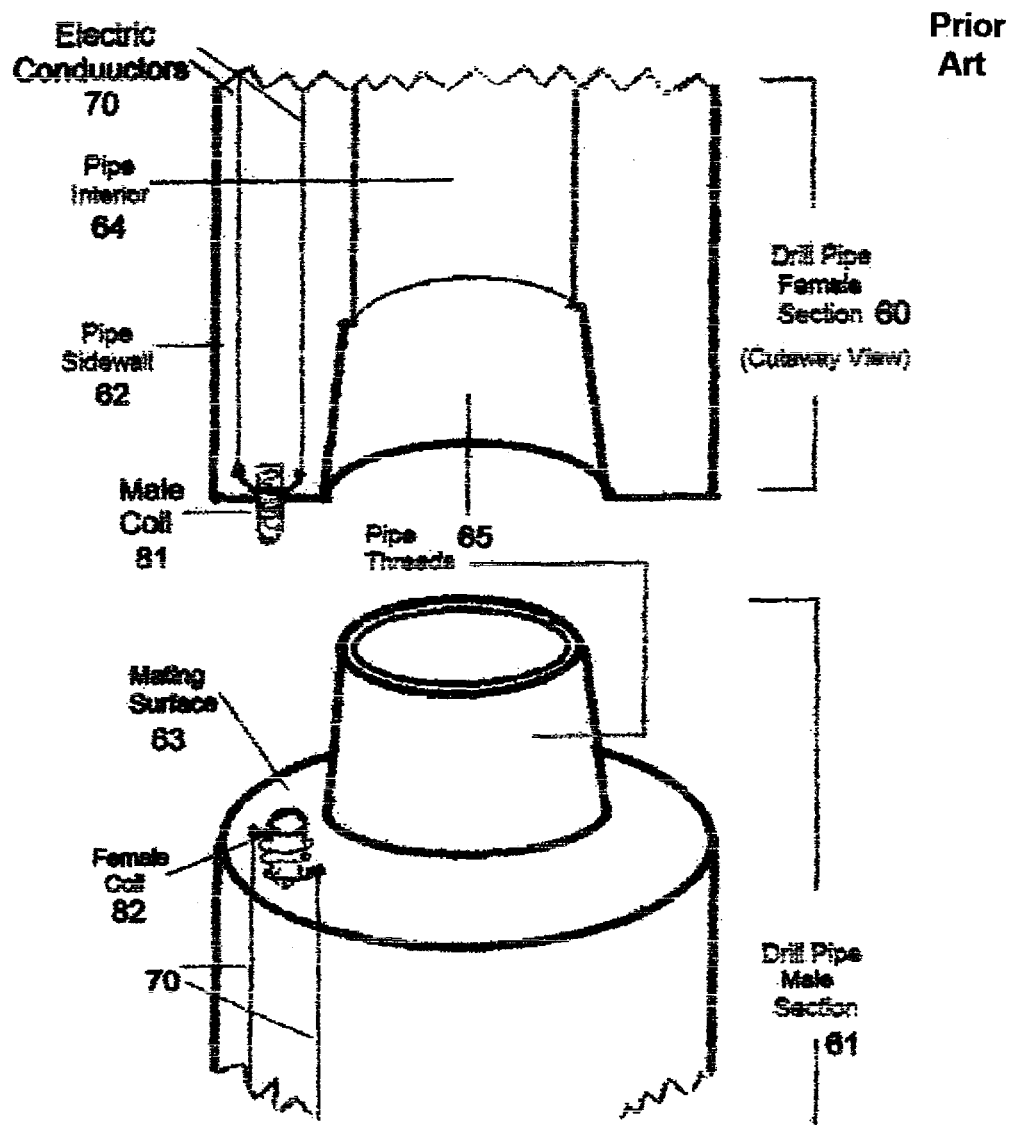
Figure 2:
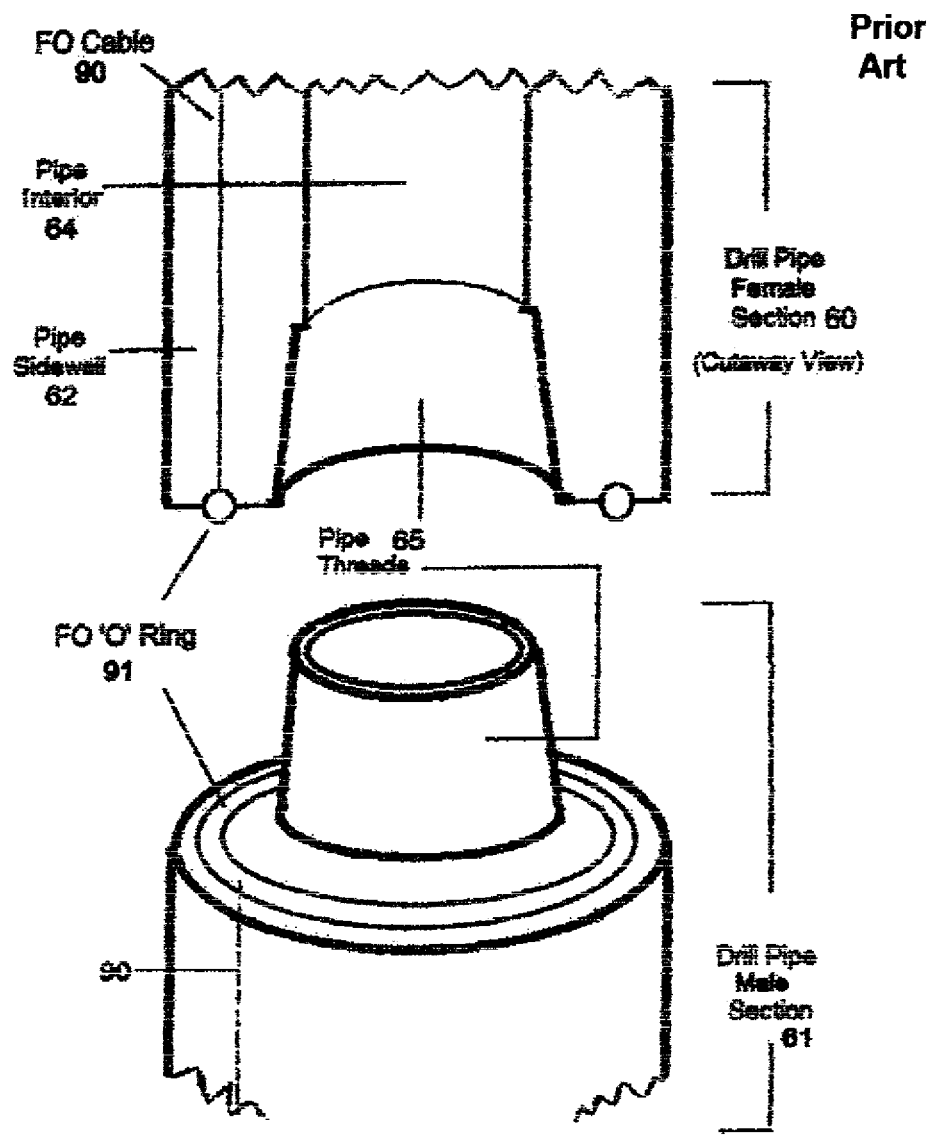
Figure 2:
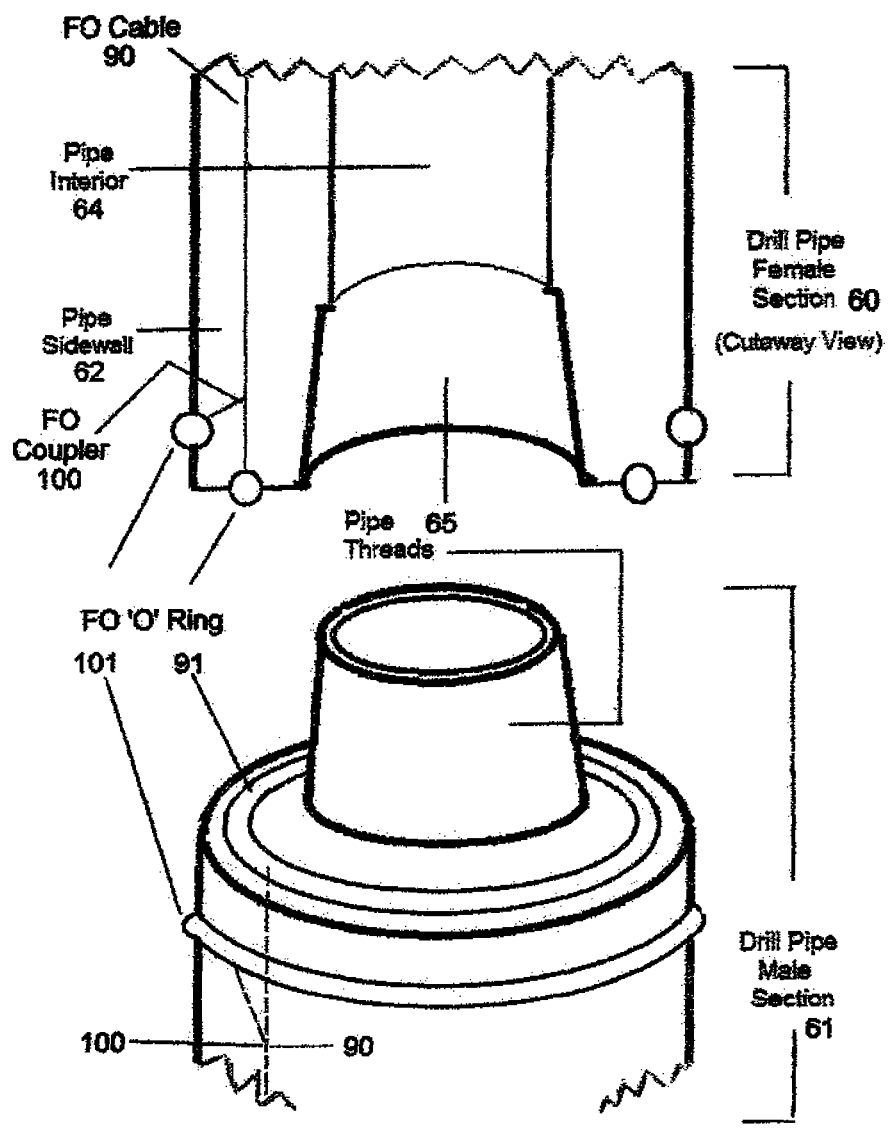
Figure 2F:
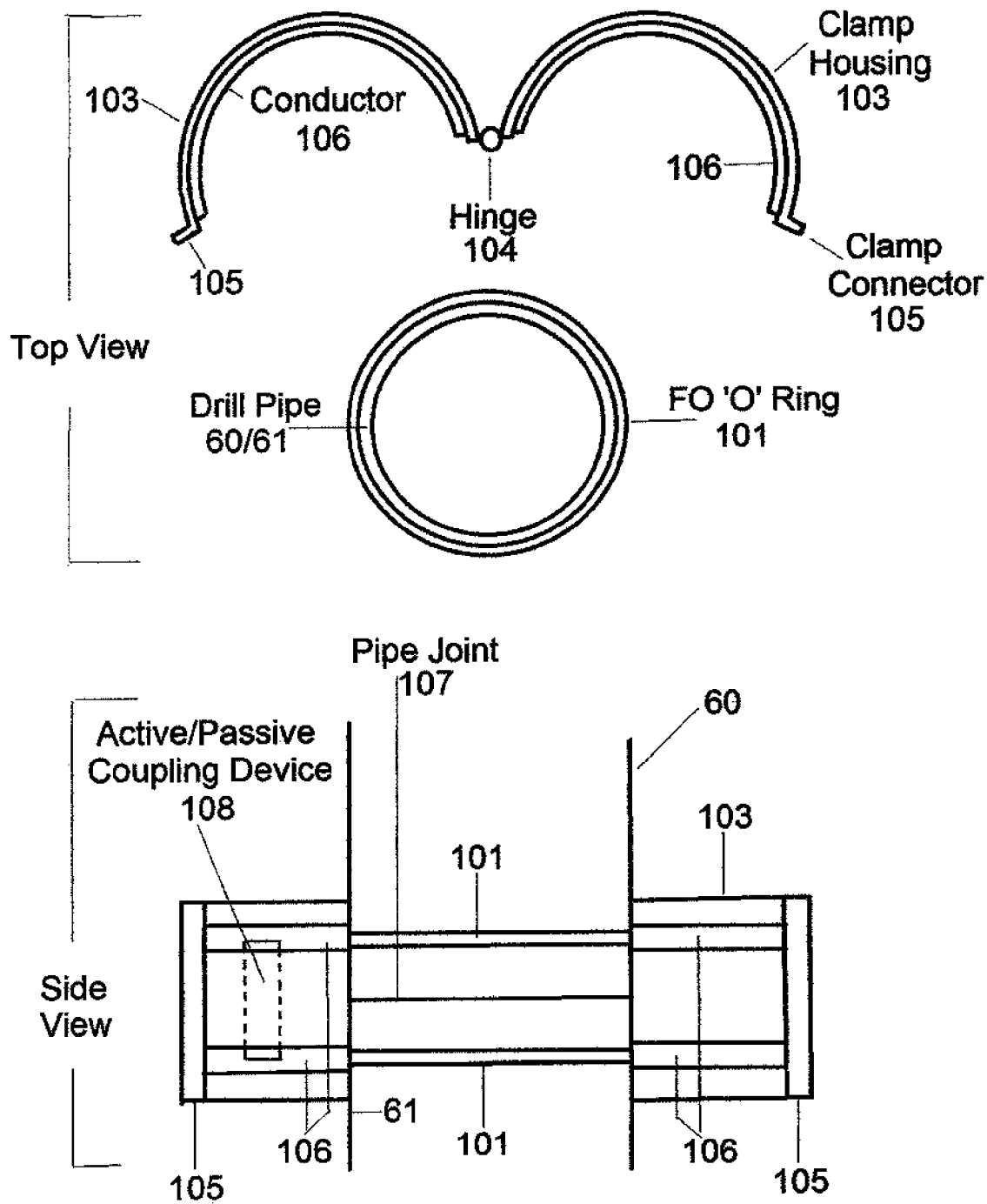
Figure 2G:
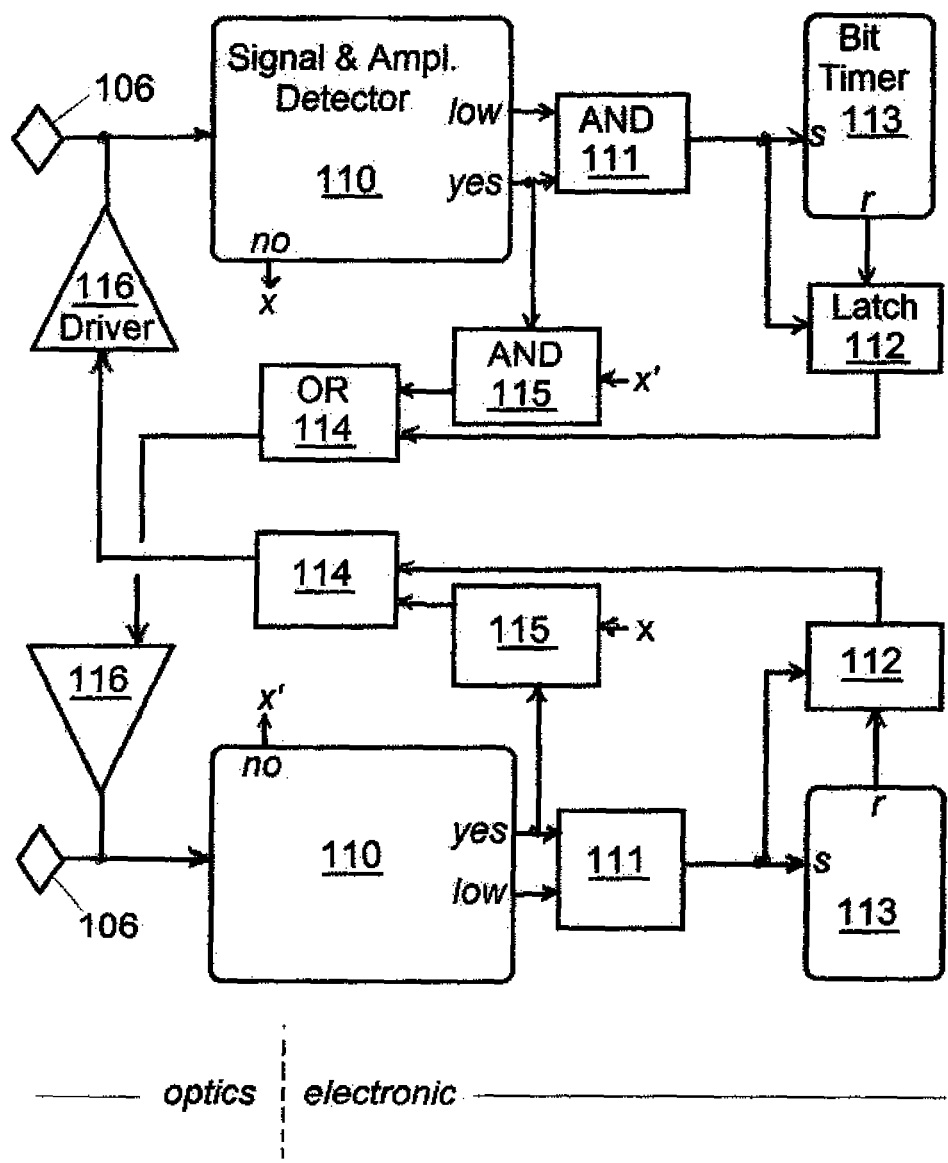
Figure 2H:
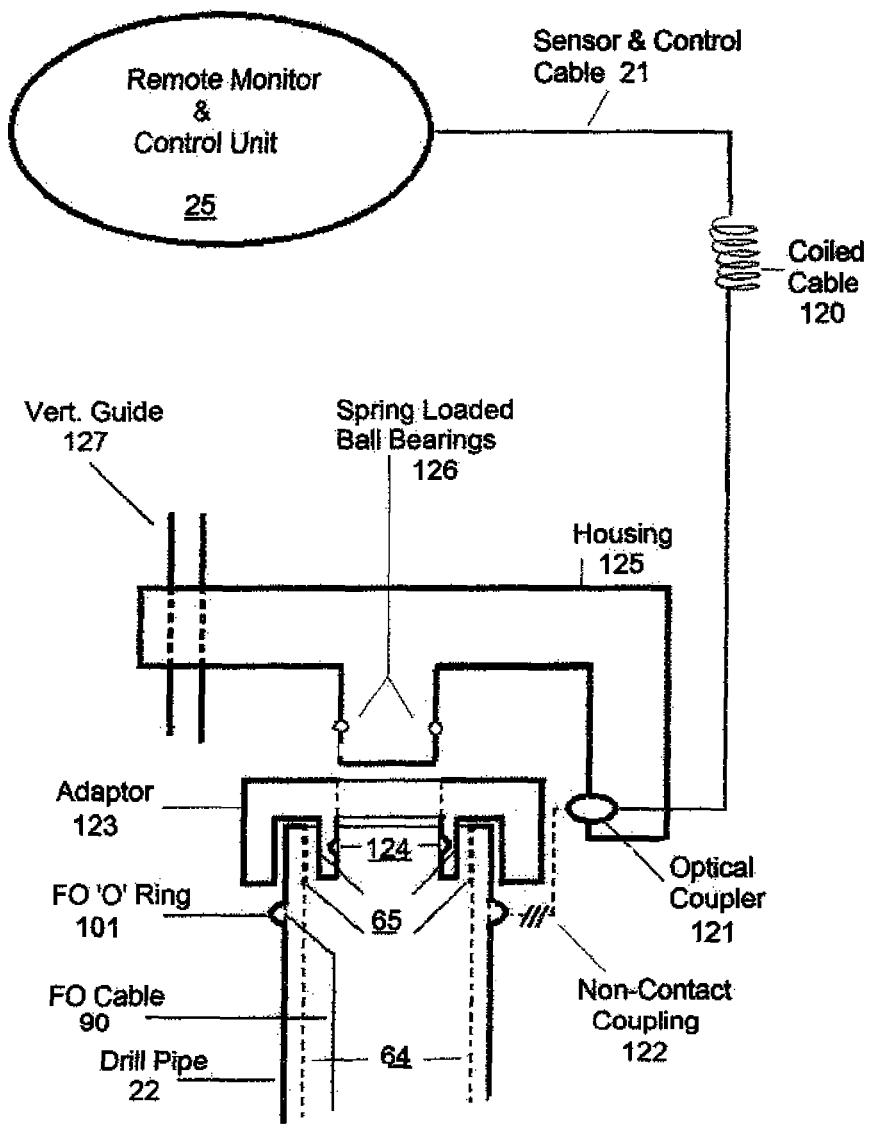

The data path is similar to that of FIG. 1A with the exception that; multiple sensor and control tool devices could be utilized, the drill pipe (22) and the drill bit (26) is shown in the well bore, the data cable (21) is re-identified (reflecting the significantly increased and diverse data), the processor and monitor (5) depicted on FIG. 1A is newly identified as a remote monitoring and control unit (25) (reflecting the significantly increased and diverse data) and the drill platform is re-identified as (28) to reflect a proposed option, (a data cable slip ring coupling device shown later on FIG. 2H).

Figure 3A:
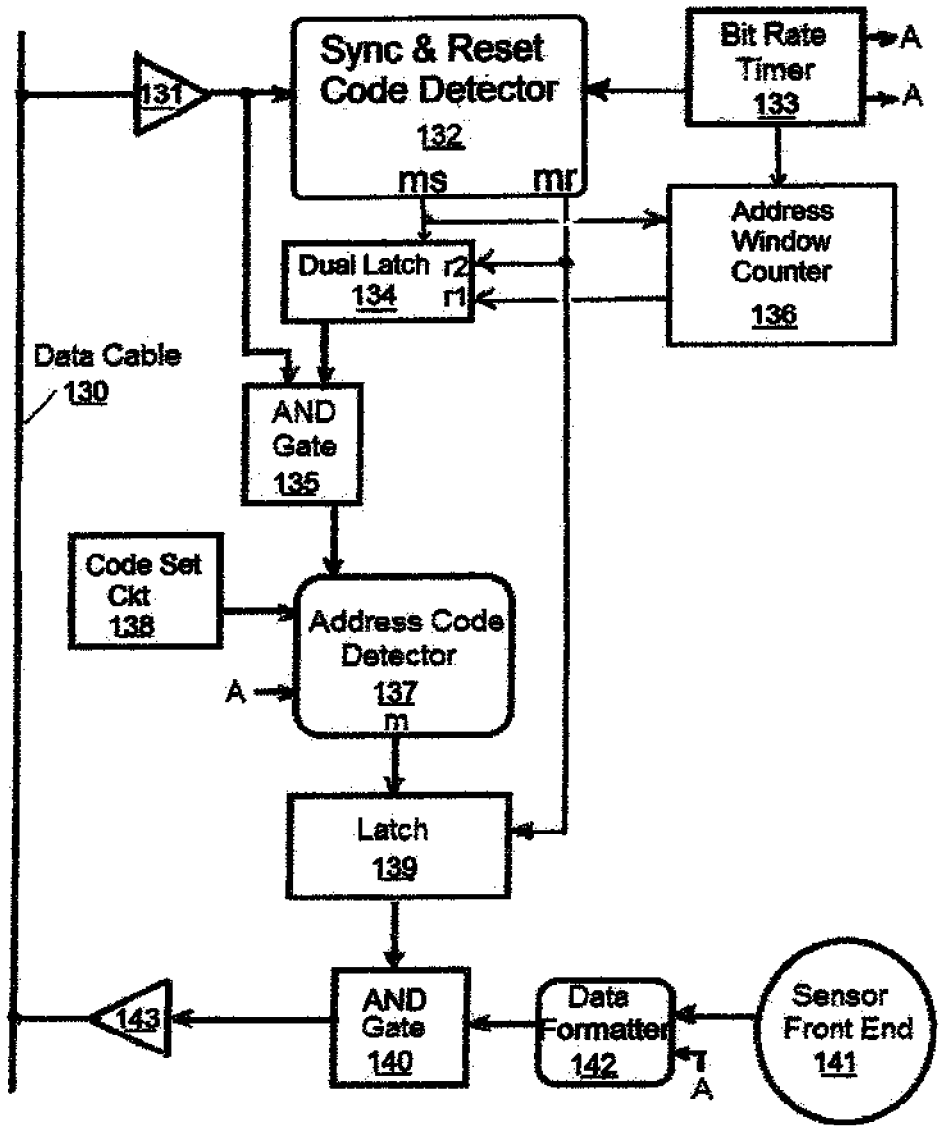
Figure 3B:
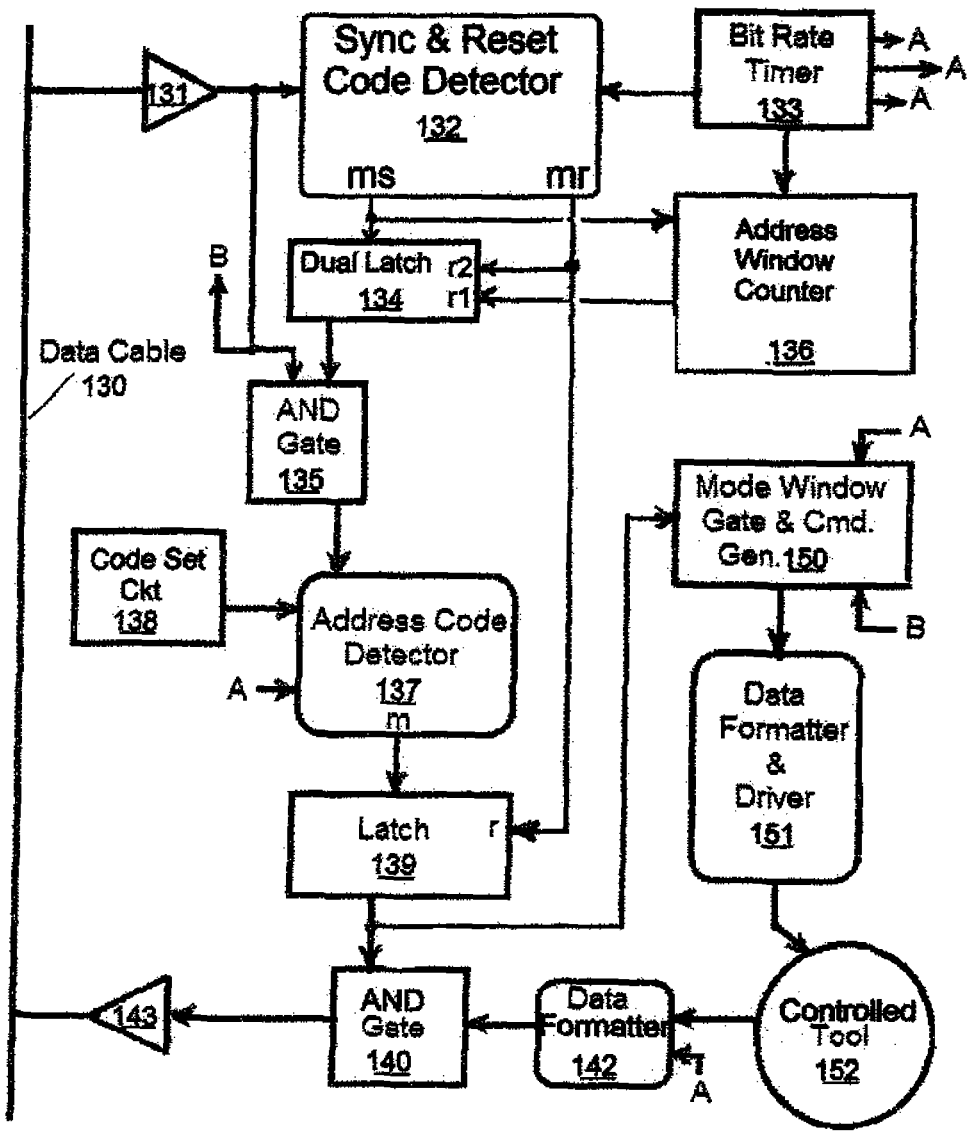

(FIGS. 3A & 3B further detail the sensor and controlled tool devices operations).

This interface is compatible with dynamic drilling and provides bandwidths well beyond any present or projected needs.

The major issue associated with this configuration is depicted as item 27, the pipe joints.

Pipe joints every drill pipe length (totaling 500-1500 joints for a deep well), where any conductivity fault of any single joint renders the entire link useless.

(FIGS. 2A-2D further depict/address this issue, FIGS. 2E-2G address a resolution).

Figure 1C:
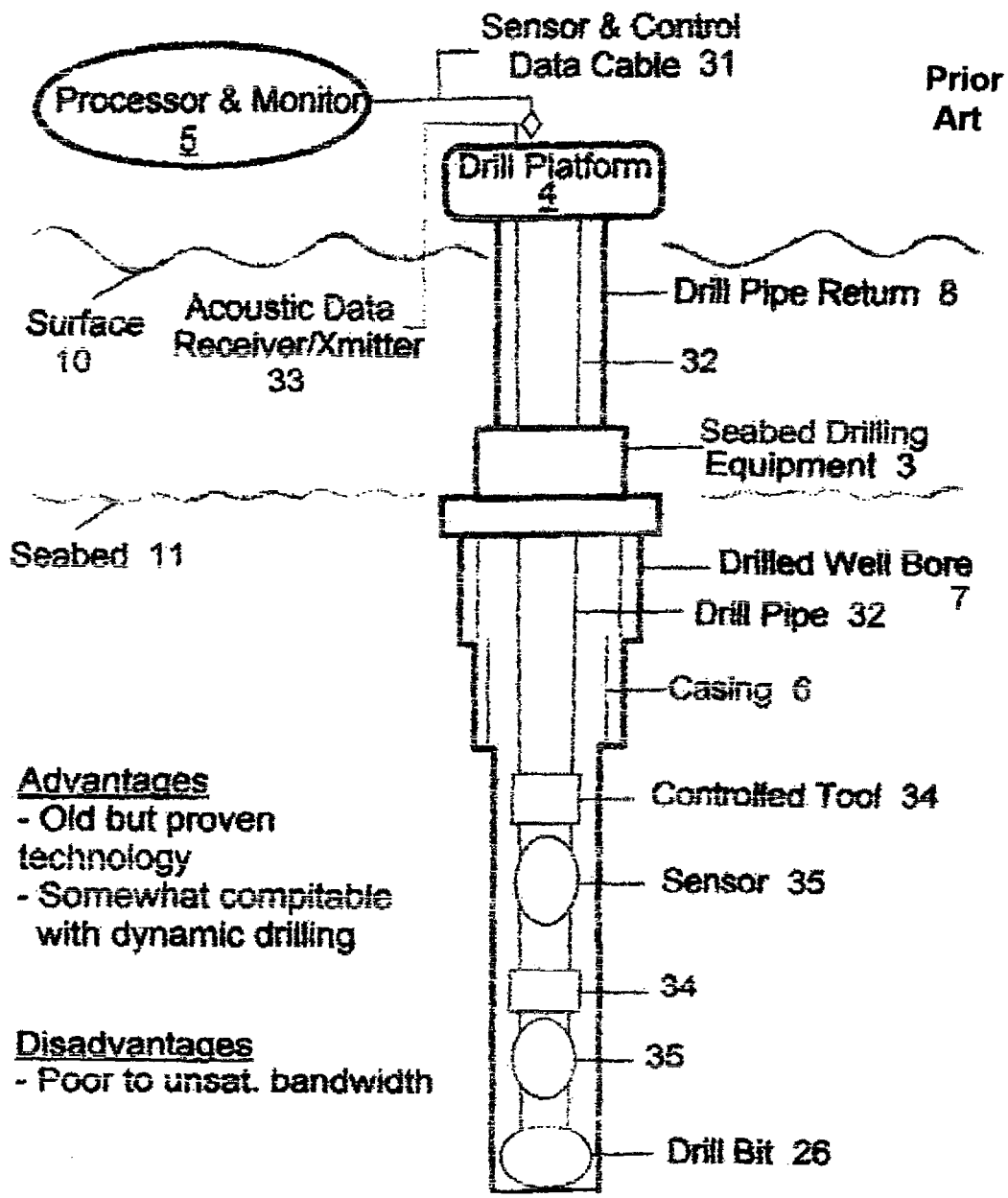

FIG. 1C depicts a mud-pulse telemetry sensor and control data interface.

Basically the command data is transmitted via a processor and monitor unit (5), converted to acoustic by data transmitter (33) installed in the mud, acoustics is transmitted through the mud and sensed by a sensor (35) or controlled tool (34). The acoustic commands are detected (by a sensor or controlled tool device), converted to electronic data and acted upon. The sensors detected data is converted in format and transmitted through the mud to the acoustic data receiver (33). The controlled tool data is converted to drive a mechanism within device. (FIGS. 3C & 3D further detail the sensor and controlled tool devices operations).

Note that; the sensors and control tools (35 and 34) identifications have changed from the prior configuration reflecting the acoustic front end changes of the receivers and transmitters. The processor and monitor (5) and the data cable (31) are also re-identified from the prior configuration to reflect the significantly lower bandwidths and associated decreased data rates.

The basic problem with this configuration is that the bandwidths are extremely low and significantly decrease as the distance of the platforms acoustical data receiver/transmitter and the sensor/controlled tools devices increases. The reliable bandwidths are so low for deep well it renders this configuration near useless.

Techniques to resolve this basic problem include acoustic receiver/transmitter relay/repeater(s) along the drill pipe. Although this does indeed reduce the transmission path length if implemented to operate in time sequence it/they will not increase the bandwidth, if impended to operate simultaneously using different carrier frequencies presents significant other data transmission issues particularly when multiple devices are employed.

Figure 1D:
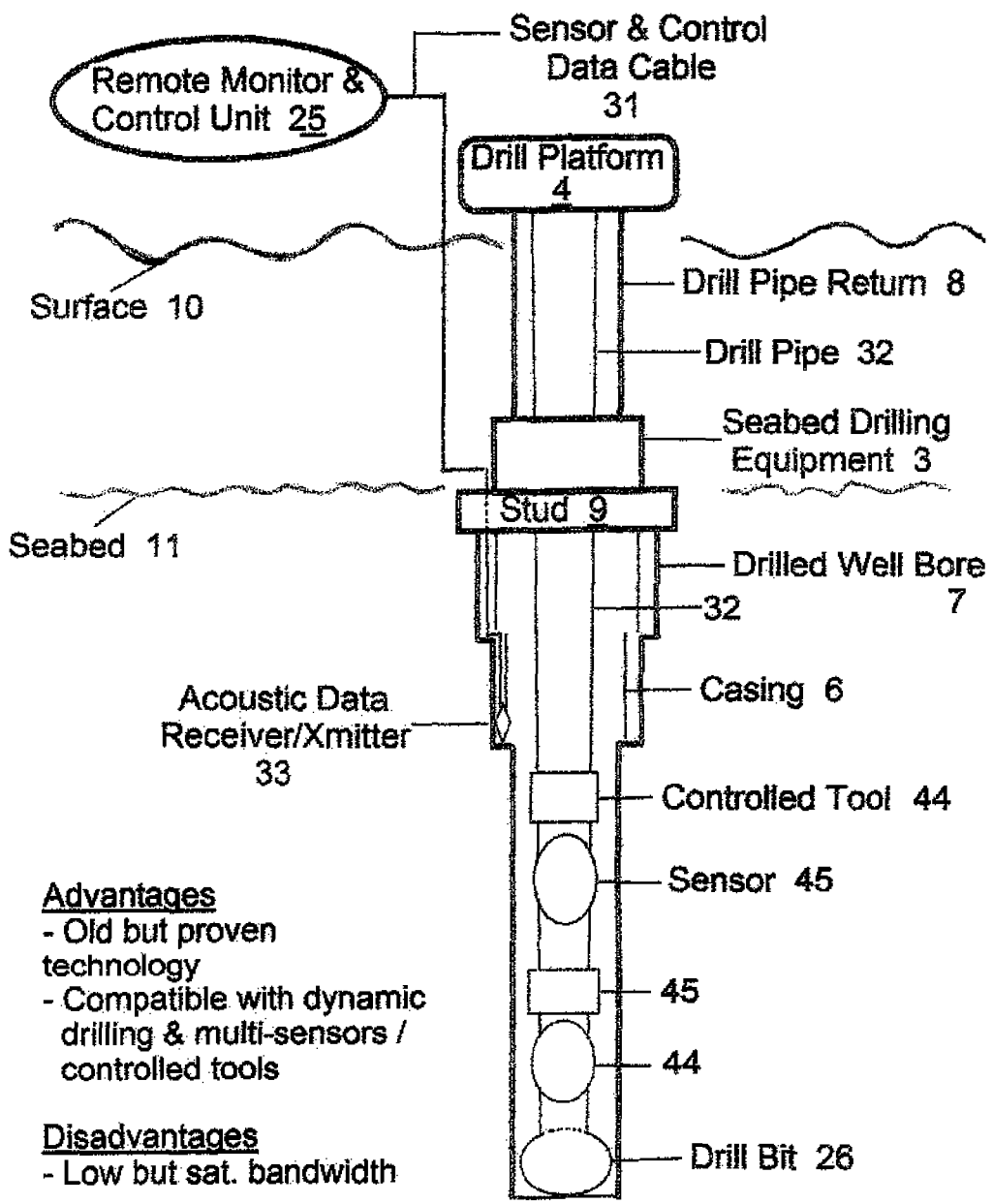

FIG. 1D depicts the modified mud-pulse telemetry interface. Basically the only difference between this configuration and the prior is the physical location of the acoustic data receiver/transmitter (33). Installing this device at the deepest practical point significantly increase the bandwidth (although still low—usable for deep wells).

Installing this unit below the first or second casing sections could half the distance.

Installing an acoustic data receiver/transmitter relay/repeater on/in the casing or drill pipe, down-bore, could again effectively reduce the distance by half.

Figure 3C:
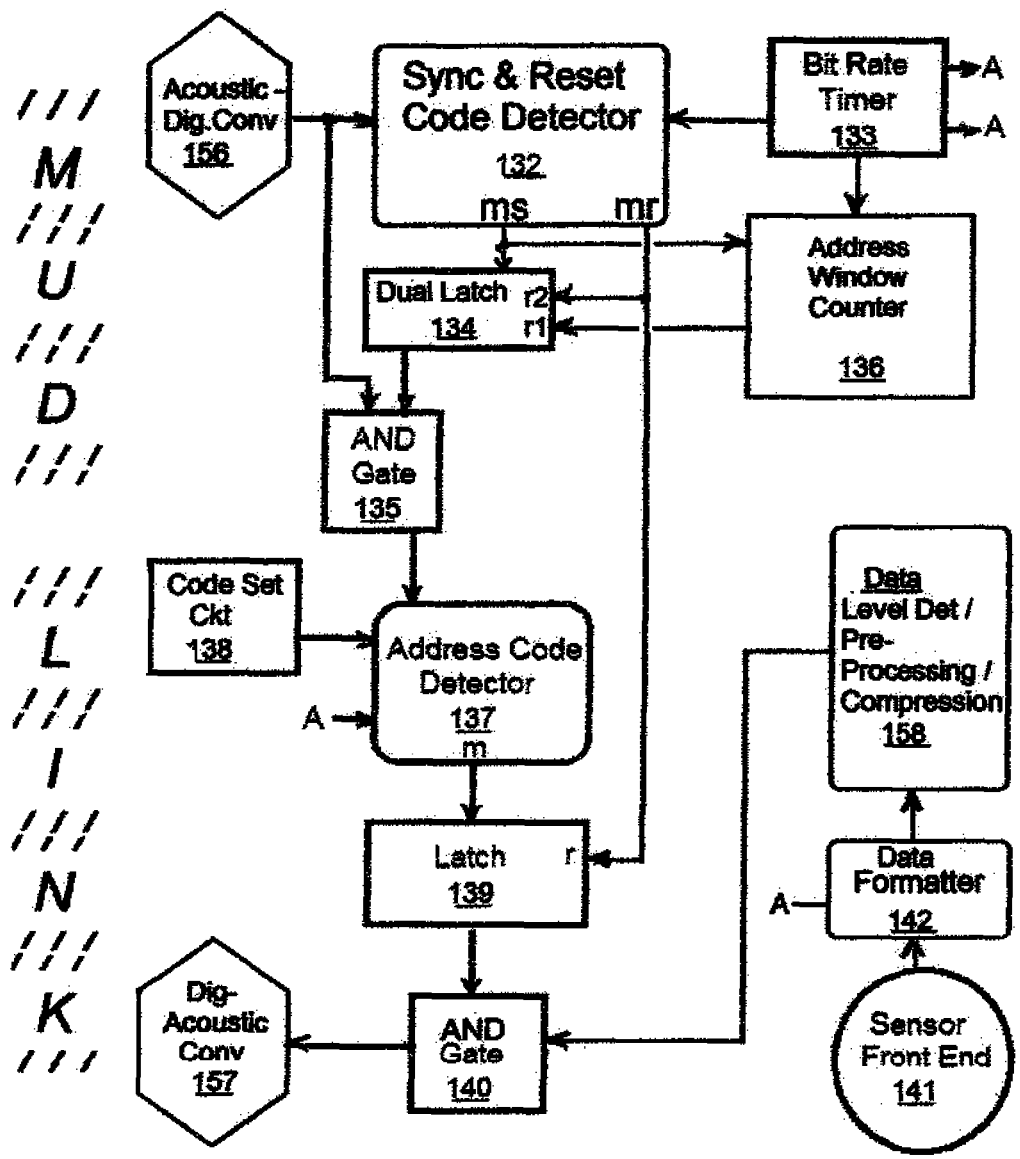
Figure 3D:
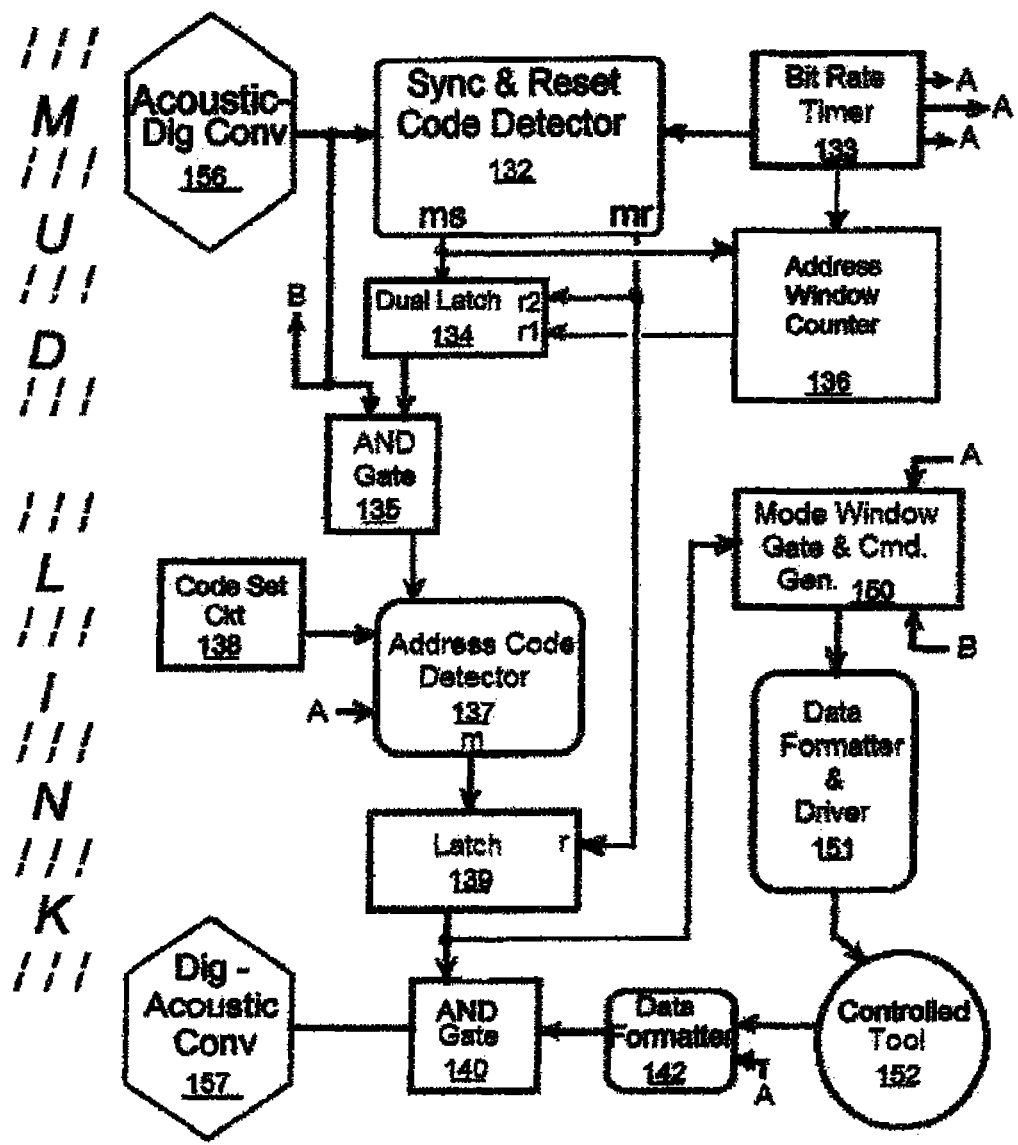

FIGS. 3C & 3D detail the sensor and controlled tool devices operations and FIG. 3C also depicts processing that significantly reduces the required sensor bandwidth—the bandwidth requirements for a controlled tool devices is minimal.

Note that; the remote monitoring and control unit (25) is re-identified because of the added capabilities of this configuration (vs. the prior) and the sensor and control tool devices are re-identified (45 & 44) reflecting that this configuration could operationally implement several of these devices.

FIGS. 2A-2D present an overview of the pipe to pipe joint connection issue and

FIGS. 2E-2G present the proposed solution.

FIG. 2A depicts a mechanical pipe joint and serves as an introductory reference to FIGS. 2B-2G. It shows a drill pipe female section (60), male section (61), pipe sidewall (62), mating surfaces (63), pipes interior section (64) and the pipe threaded area (65).

FIG. 2B depicts the pipe joint contact connections for an electrical insulated conductor (70) showing a spring-loaded male connector (71) and a female connector (72).

It is difficult to envision how the mechanical pipe threading and the male and female electric connectors are aligned, but it is assumed the lower connectors could be replaced by circular conductive surfaces on mating surface.

It is also difficult to project confidence in the integrity of such a data link path, as it transitions through hundreds of such joints—particularly as the joints are assembled in a (non-ideal) drilling environment.

FIG. 2C depicts the pipe joint interface utilizing inductive coupling. Basically this approach modifies the prior approach by changing electrical connectors to a male coil (81) and a female coil (82).

It is similarly difficult to envision how the mechanical pipe threading and the male and female inductive coupling coils align, but assuming there is some practical manner to ensure such alignment, again it is also difficult to project confidence in the integrity of such a data link path, as it transitions through hundreds of such joints—particularly as the joints are assembled in a drilling environment. The confidence of the integrity of such a run is also questioned from an impedance (build-up) standpoint.

FIG. 2D depicts a pipe joint fiber-optic interface where the two electrical conductors are replaced by a single fiber-optic conductor (90). The electrical contacts/inductive electrical coupling elements are replaced by fiber-optic O-rings (91) that are compressed together as the pipe is mechanically joined—forming a fiber-optic conductive path. Although this method provides several technical advantages and therefore provide improved confidence in the integrity of such a data link path (as it transitions through hundreds of such joints—particularly as the joints are assembled in a drilling environment), although the confidence is significantly improved it falls short of being acceptable.

FIG. 2E depicts the pipe joint fiber optics interface incorporating an external passive/active redundancy feature that incorporates a second set of fiber-optic O-rings (101) installed on the exterior surface of the drill pipe and connected to the embedded fiber-optic cable via. fiber-optic couplers (100).

It is noted that the circuit utilizes standard off-the-shelf fiber-optic/electronic component and further noted that although the figures/discussion specifically identify fiber optics, the design could be modified and made applicable for a wired conductor configuration.

FIG. 2F depicts the external coupling device used to provide (redundant) conductivity for the exterior drill pipe fiber-optic O-rings.

A mechanical pipe clamp housing (103), associated hinge (104) and associated mechanical clamp connectors (105) are shown along with an upper and lower fiber optic conductors (106) attached to the interior of the mechanical pipe clamp housing device.

An active/passive coupling device (108) is attached to these upper and lower fiber-optic conductors. The passive element of item (108) is strictly a fiber-optic conductor, while the active element is a bidirectional fiber-optic sensing, amplifying in-line driving optical coupling device depicted on FIG. 2G. The fiber-optic connectivity is obtained as the clamp connector ends are mechanically secured and compress the clamps conductors into the pipes exterior O-rings.

It is noted that the circuit utilizes standard off-the-shelf fiber-optic/electronic component and further noted that although the figures/discussion specifically identify fiber optics, the design could be modified and made applicable for a wired conductor configuration.

FIG. 2G depicts a bi-directional fiber-optic coupling device. The circuit utilizes standard off-the-shelf fiber-optic and electronic components. The device is optically or physically coupled to items (106). The upper circuits input are connected to a signal and amplitude detector (110) that monitors for the presents and for the signal strength of the input. If any signal is present the (yes) output will be set high and the (no) output will be set to zero (or the inverse). If the signal is detected and it is below a predetermined threshold the (low) output will be set high (or the inverse). If both (yes) and (low) are high, 'and gate' (111) will pass the high to a latch (112) and a bit timer (113), the latch will hold the signal high until the bit timer sends a reset (r), the bit timer clock is set at one data bit rate (therefore the latch outputs the high one data bit long), the latch output goes to 'or gate' (114) and the lower optical driver (116) that sends a 'normal' (amplified) level signal to the lower external optical O ring via item (106). If the signal amplifier and detector detects a signal presence that is not (low), 'and gate' (111) will not pass the signal to the bit timer or latch, but the (yes) will enter 'and gate' (115). If the lower signal and amplitude detector does not detect a signal at this time, the lower signal and amplitude detector will set (x') high that is sent it to 'and gate' (115) that sends the signal to 'or gate' (114) that will pass the signal to the lower o ring via items (116 & 106). Although not shown—the lower unit 110 outputs of 'no' and 'low' are feed into an 'or gate' that develops the (x') signal. The lower circuit shown on FIG. 2G is a mirror image of the upper circuit and acts in identical fashion monitoring the lower input.

It is noted that the circuit utilizes standard off-the-shelf fiber-optic/electronic component and further noted that although the figures/discussion specifically identify fiber optics, the design could be modified and made applicable for a wired conductor configuration.

FIG. 2H depicts an optical slip ring coupling device providing the means to interface the in well data cable during actual drilling operations. The data cable from/to unit 25 is shown with three items in series with the fiber-optic O-ring (101) (connected to the fiber-optic cable (90). The first item is simply a coiled cable (120) that would expand as the drill pipe is lowered/drill in the well. The second is a bi-directional receive/transmit non-contact optical coupler device (121) and the third item (122) is a depiction of the non-contact (optical) coupling area. A drill pipe adapter (123) includes a center hole that incorporates a circular cut-out raceway (124). The adapter screws into the drill pipe via drill pipe and adapter threads. A coupler housing (125) incorporates a circular protrusion slightly smaller in diameter than the adaptor's center hole. The said protrusion incorporates spring-loaded ball bearings (126) that snap into the adapter's raceway and secure the housing to the adapter and allow for a mechanical slip ring connection. (The housing will follow the drill pipes vertical motion but will be isolated from its circular motion—except for friction). The housing will further contain a guide hole where a vertical pipe guide (127) secured to the drilling structure limiting the housing's rotational motion.

It is noted that the circuit utilizes standard off-the-shelf fiber-optic/electronic component and further noted that although the figures/discussion specifically identify fiber optics, the design could be modified and made applicable for a wired conductor configuration.

Figure 3E:
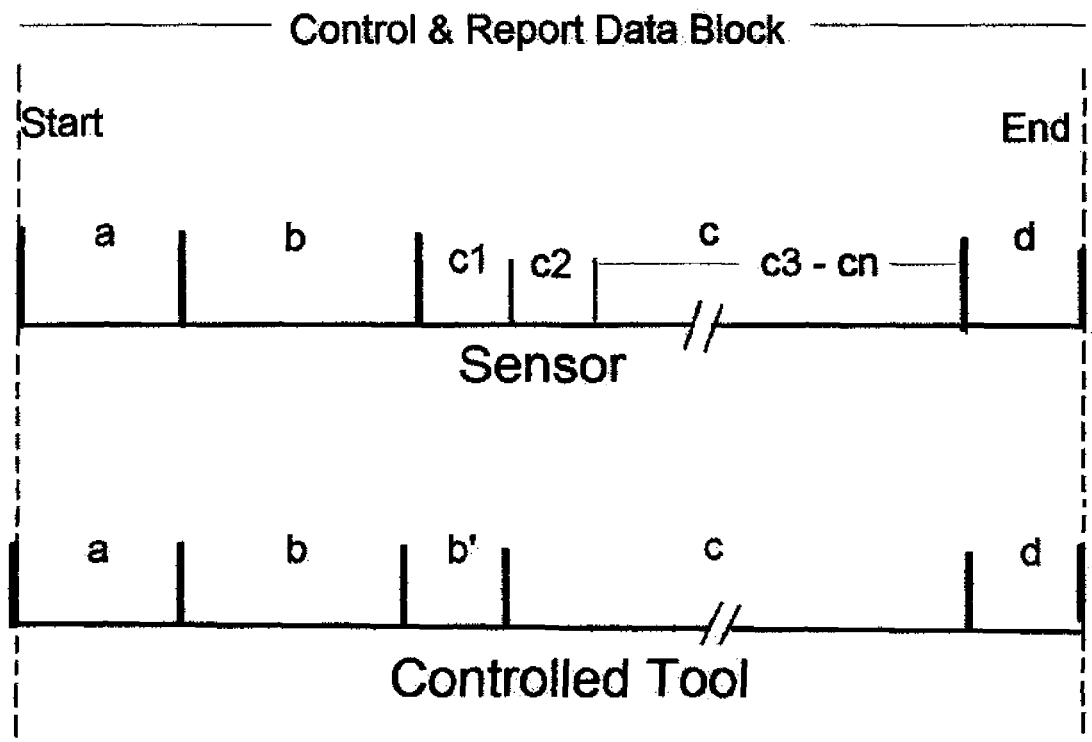

FIGS. 3A and C presents the sensor digital interfaces for fiber optics and mud-pulse telemetry respectfully. FIGS. 3B and D presents the controlled tool data interfaces for fiber optics and mud-pulse telemetry respectfully and FIG. 3E presents the digital timing sequence associated with these interfaces. The digital timing sequence supports the understanding of the descriptions associated with FIGS. 3A-3D.

It is noted that the circuit utilizes standard off-the-shelf fiber-optic/electronic component and further noted that although the figures/discussion specifically identify fiber optics, the design could be modified and made applicable for a wired conductor configuration.

FIG. 3A depicts a fiber-optic sensor digital interface. The fiber-optic data cable (130) is monitored and its input feeds fiber-optic to digital circuit converter (131). One of the outputs of unit (131) is sent to a sync and reset code detector (132) that is also fed by a bit rate timer (133) that outputs timing pulses at the systems bit rate. When the sync and reset code detector receives a unique sync code from the system it sets the matched synchronization, (ms) high, that is sent to a dual latch (134) and an address window counter (136). The counter counts the bit rate timers input and outputs a signal after the time reflecting the bit width of address codes. This output resets the dual latch. Prior to the latch being reset the latch output enables 'and gate' (135) (that also receives the input data from (131)). The output of the 'and gate' (represents the next element of the data block—the address code) that is sent to an address code detector (137). The address code detector also inputs a selectable identification code for the device via a code set circuit (138). The address code detector looks for a match (with respect to the code set and the input data during the address window period). If the address code detector detects a match (m) sets latch (139) high enabling 'and gate' (140) to pass sensor data from sensor front end (141) via. data formatted by (142) to fiber-optic data cable/line via line driver (143). The sensor data continues to pass to the data cable until the sync and reset code detector detect a system reset code. When that code is detected a match reset (mr) is generated and resets latch (139) and latch (134)—if necessary. The circuit than waits for new sync code detection.

FIG. 3B depicts a fiber-optic control tool digital interface that basically functions in an identical manner to the prior/sensor interface except, latch (139) enables a mode window gate in command generator (150) that looks at the input data during a command window. And if commanded, transfers the command to a data converted and driver (151) that drives control tool (152) to the commanded mode/configuration. The controlled tool reports its new configuration and any relatable data to the data cable via data converter (142) 'and gate' (140) and driver (143).

FIG. 3C depicts a mud-pulse telemetry sensor digital interface that basically functions in an identical manner to the prior sensor interface (FIG. 3A) except; the input include an acoustic to digital converter (156) and the output includes a digital to acoustic converter (157). The sensor front end data (141) is similarity passed to data converter (142) but then processed by data level detector and/or a pre-processing function and/or a data compression function (158) and then passed to the data link via 'and gate' (140) and digital to acoustic converter (157). As another means to compensate for the low bandwidth of the mud-pulse configuration, the address code could be modified so that some or all sensors sequentially report their data in one control and reporting data block, as depicted on FIG. 3E. The acoustic to digital converter (156) also includes an automatic gain control (AGC) circuit that monitors signal strength of a sample of the input acoustic signal and adjust the gain of its front end to compensate for low to excessively high input signal strength. Although not shown, this AGC is sent to the output digital to acoustic converter (157) that adjusts the acoustic signal level output accordingly.

FIG. 3D depicts a mud-pulse telemetry controlled tool digital interface. The input & output links are basically identical to the prior circuits (FIG. 3C) operations and the output processing is identical to the fiber optics controlled tool digital interface (FIG. 3B).

FIG. 3E depicts digital timing sequence indicating the different aspects of the control and reporting a block of streamed data.

Figure 4:
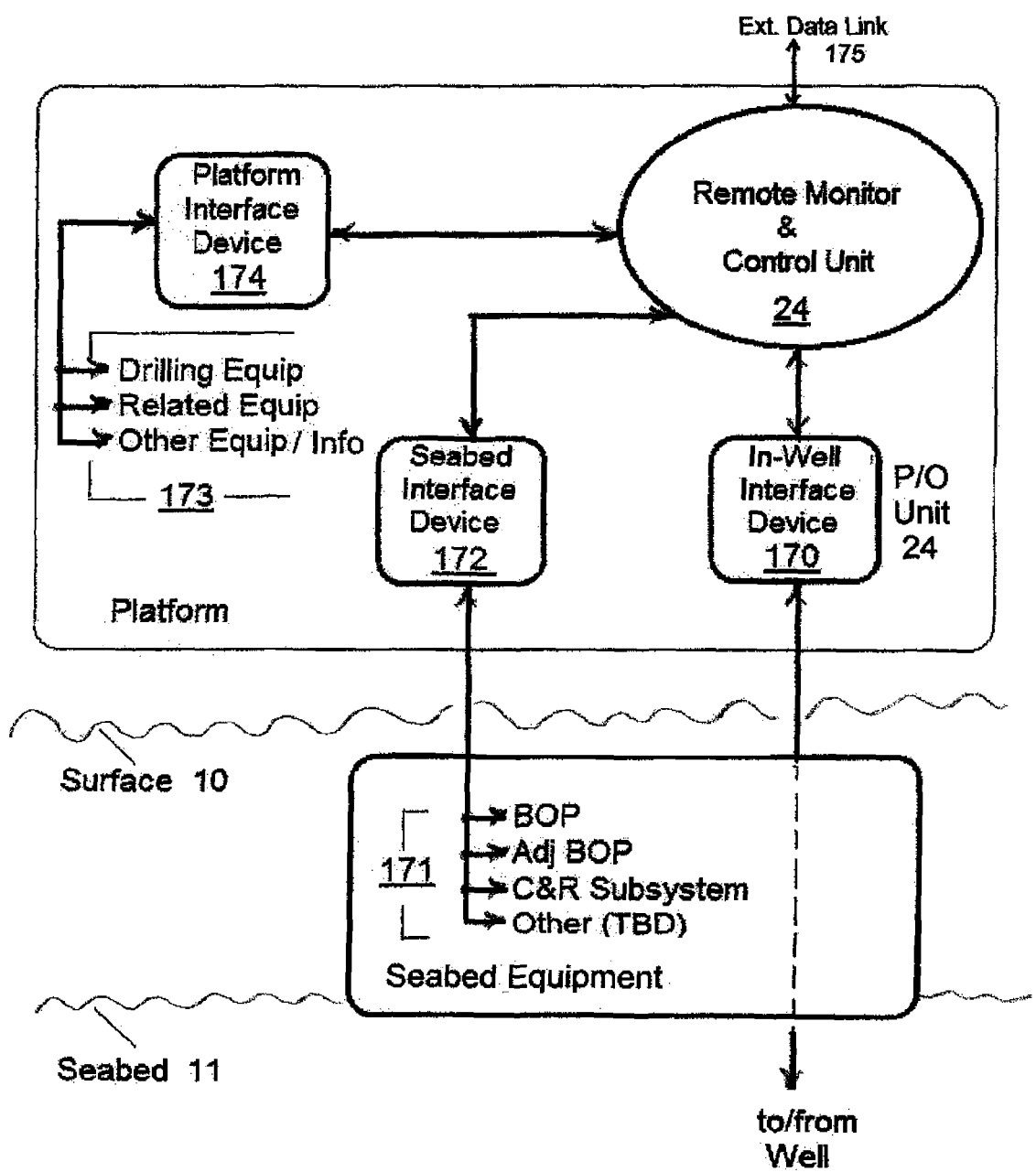

FIG. 4 depicts the remote monitoring and control subsystem interface. The drawing reflects the basic purpose/intent of the subsystem (integrating all relevant/relatable information associated with the status of the well drilling operation into one data base) where the data is stored, analyzed with respect to norms, and generate status reports, alerts, recommendations/automatic controls.

The subsystem further interfaces with all relevant/relatable control devices bringing all such controls to a central controlling device.

As the interrelationship of the information becomes complex and as some situations require rapid/timely responses, a processor/computer and associated software programs are required.

The means to monitor and control in-well sensor and controlled tool devices is the very title of this divisional patent, but the specification's detailed description of this invention specifically identifies numerous other sensors and control subsystems/devices including those that are part seabed equipment. One can not effectively/properly utilize the in-well controlled devices without knowledge of the seabed's equipment/status nor could one utilize the seabed equipment without knowledge of the in-well's status. Coordinated actions must be taken with knowledge of all related conditions. The Platform equipments relate to this to the same extent, as well as information from external sources.

This subsystem identifies means to integrate & utilize the in-well senses and control devices as well as the seabed equipment's sensor and control devices and the platform's equipment, as well as information from external sources.

The in-well sensor and control devices and related interface is defined in detail throughout this specification. The in-well interface device (170) is discussed within this patent as part of the remote monitoring and control unit (24). Item 170 is separated on this diagram (using artistic license) with the intent of depicting uniformity with the seabed equipment and platform devices/subsystems. Item 170 is basically a bidirectional data formatter interfacing device interfacing with the in-well sensor and controlled devices and a remote monitoring and control unit (24). Item 171 represents various devices/subsystems on the seabed. The BOP is presently the only controlled device being utilized. The adjunctive BOP (identified in this patent specification) serves as a functionally redundant BOP. The capture and recovery (and diversion) subsystem (identified in this patent) could serve as a supporting element to control a blowout. The 'other' is shown to reflect future to be developed/determined items. The interface path between items (24 and 171) shows the seabed interface device (172). This device provides an alternative path to the various switching and monitoring devices presently employed and provides analog-to-digital, digital-to-analog, data formatting and line drivers.

Item 173 represents various devices/subsystems on the platform that are directly part of the drilling operations (such as drilling motors, pipe lifts, etc.), those that directly relate to the drilling operations (such as mud pumps, mud monitors, mud tank closing device, etc.) and those that indirectly relate (such as radar, weather conditions/predictions, sea conditions, formation data, etc.).

The interface path between items (24 and 173) shows the platform interface device (174).

This device is similar to item 172 and provides an alternative path to the various switching and monitoring devices presently employed and provides analog-to-digital, digital to analog, data formatting and line drivers. Item 175 identifies an external data link that provides information/control to/from off-platform sources.

Figure 5A:
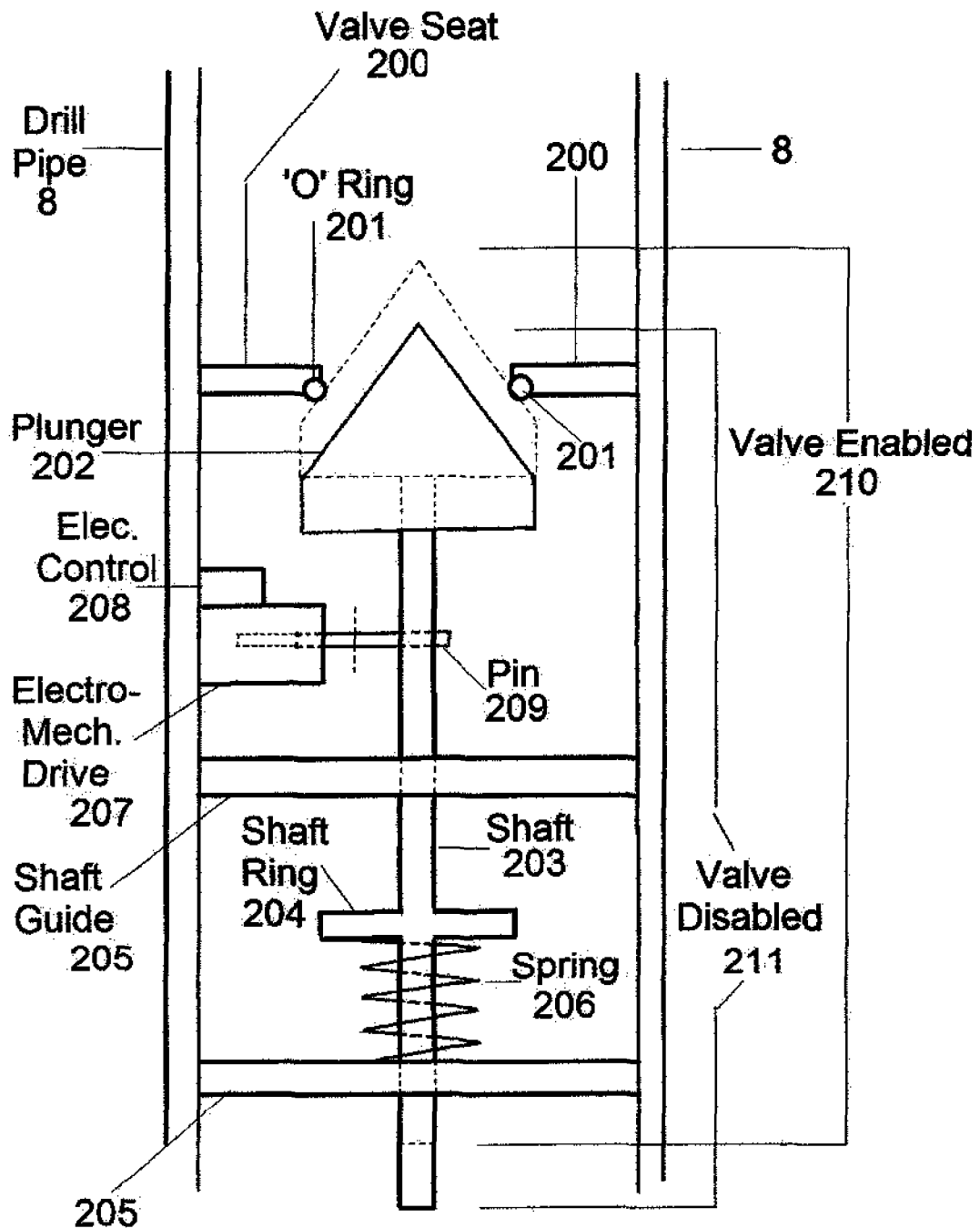

FIG. 5A depicts a controlled check valve installed within the drill pipe (8) that allows for bi-directional flow of liquid/gas in the pipe until it is activated/enabled, when activated it allows flow one direction only.

Basically a plunger (202) capable of closing on a valve seat (200) and O-ring (201) is connected to a shaft (203). The shaft is held by shaft guides (205). A shaft ring (204) is mechanically connected to shaft. A spring (206) is installed between the lower shaft guide and the shaft ring—attempting to push the plunger into its valve seat. The shaft further includes a horizontal hole where in electro-mechanical drive device (207) that provides the means to mechanically move pin (209). The pin initially extends into the shaft hole disabling the shifts upward motion. Upon a digital activate command from the in-well control data cable interface, the electronic control unit (208) senses the command and enables/drives electro-mechanical drive device to pull the pin clear of the shift and enables the plunger to operate as a check valve.

It is noted that: a) the internal mechanism could be altered using numerous known designs—the unique factor is the remote electronic/FO. control, b) The presented design allows activation but does not allow for deactivation—this design limitation was intentional—to emulate the functionality of the existing in-use check valve that is mechanically activated by increasing mud pressure, c) The design of a device capable of both activating and deactivating could be derived from the presented design (or many other known designs—such as one based on a toilet tank valve, where the pull-chain (controlling a flapper type valve) is controlled by a in-out drive motor/solenoid.

Figure 5B:
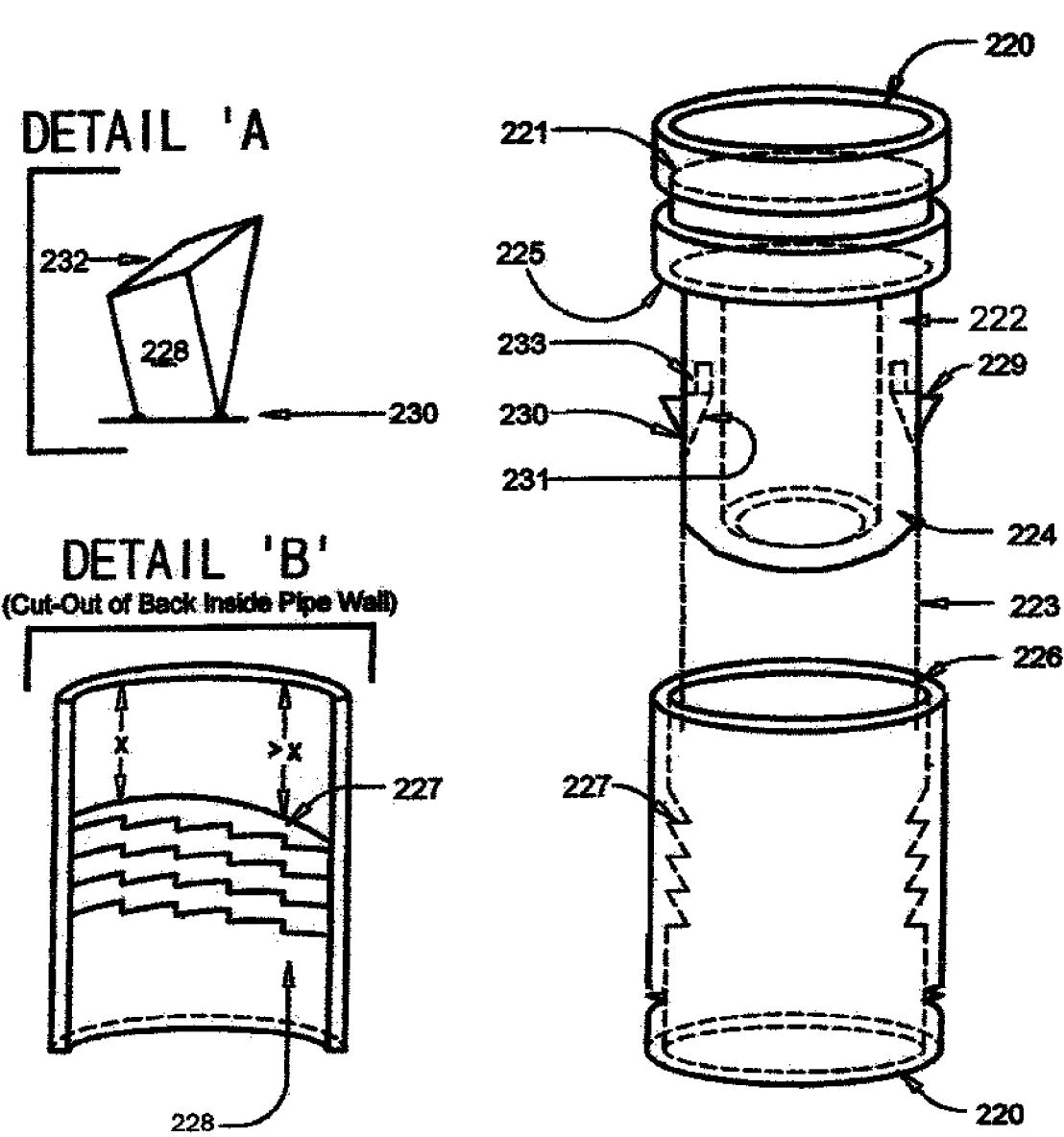

FIG. 5B depicts a matching/mating pair of coupling/de-coupling pipes.

Items 220 are the upper end & lower end of the upper & lower coupling pipes. These ends have standard pipe to pipe coupling means. Item 221 (in dashed lines) indicates the inside wall. Item 222 is the smaller diameter upper pipe coupling surface that fits within the lower coupling pipe as indicated by the dashed lines of Item (223). Item 224 depicts a tapered bottom portion of the upper pipe, allowing it to initially align/fit into the lower section. Item 225 is the upper pipe's mounting flange & gasket that mates to the lower pipes mounting flange item 226. Item 227 is a unique threaded element in the interior sidewall of the lower pipe. The 'unique' threads have a stepping characteristic as shown on Detail 'B' item 228. The widths of the individual steps are slightly larger than the width of the remote controlled Spring Loaded Grabbing Device (SLGD), item 229. Items 229 are installed on the upper coupling pipe via Pivots (230) and normally extend out from the sidewall via its internal spring. When compressed the SLGD fits into the pipe's sidewall per item 231. Detail 'A', item 232 indicates a sloped mating (mating the slope of item 228) of the SLGP. As the upper & lower sections are joined the SLGDs compress into the sidewall and springs in & out of the different levels of the stepped threaded element. When the mounting flanges bottom-out the upper pipe is turned clockwise (where it ratchets into, further tightens and locks into the threaded—stepped element. The pipes de-couple via energizing the SLGD remote control mechanism, item 233 where the SLGD is pulled into its sidewall unlatching/freeing the two pipe sections.

DETAILED DESCRIPTION OF THE INVENTION

The system of the present invention comprises two functional and physically integrated subsystems, the Multi-Function Well Subsystem (MFWS) and the Intrusion Detection and Response Subsystem (ID&RS).

Both MFWS configurations (Fundamental and Advanced) utilize 'other' (not shown on Figures) unique support devices including:

Production Hard Cap (PHC)
Remote Monitor and Control Unit (RM&CU)
Re-Case End Pipe (R-CEP)
Re-Case Pipe (R-CP)
Bottom Kill End Pipe (BKEP)
Kill Pipe (KP)
Modified Conversion Float Valve (MCFV)
Modified Casing (MC)
Modified Reamer Shoe/Drill Shaft (MRS/DS)
Modified Drill Bit (MDB)

The Production Hard Cap (PHC) is a simplistic device. It is round as viewed from the top and has a mounting surface compatible with both the Production Valves and the Production Ports. The PHC is utilized to provide means to cap each individual unused Production Port and/or Valve.

The Remote Monitor and Control Unit (RM&CU) is a platform mounted specialized device associated with the Multi-Function Well Subsystem (MFWS).

The RM&CU will provide the surface platform to sea-floor and in-well equipment man-machine monitor & control interface. The RM&CU will include processing capability to provide operator recommendations and warnings, as well as an automatic mode to control the sea-floor and in-well equipment for critical/emergency situations. Although specific operational displays, modes, functions or controls are not specified in detail at this time, it is assumed the RM&CU equipment (such as monitors, computers and interface devices) matching/exceeding the system requirements are commercially/off-the-shelf available. The Re-Case End Pipe (R-CEP) is a pipe section smaller in diameter than the installed well pipe/casing in need of repair when the drill pipe is not in the well. It will have a remotely controlled initially closed bottom end valve, a remotely controlled expandable 'o-ring'/gasket around its outer circumference near the closed end. It will further have a remotely controlled sidewall gate valve located slightly above the said gasket. Prior to installing the R-CEP the number of sections of Re-Casing Pipe (R-CP) required to repair the well must be determined. At a point above where the existing well pipe is in need of repair but below the BOP, a pair of remotely controlled Coupling/De-Coupling Pipes shall be joined, followed by additional sections of R-CP from above the bottom of the BPO to the surface platform. The R-CEP and R-CP would be lowered through the 'normal outer/return drill pipe' to the desired location. The R-CEP gasket would be energized sealing/closing/choking the pipe to pipe area.

The sidewall remotely controlled gate valve will be opened and mud followed by concrete would be pumped directly into the re-casing pipe. The mud/concrete flows through the opened gate valve and into the pipe/casing in need of repair to seal the pipe to pipe/casing area. The concrete will flow through said area until cement is detected in the pipe to pipe area above the last (highest) section of well pipe that needed repair. The concrete pumping will stop, the sidewall gate valve will be closed and the concrete will be removed from the interior of the Re-Case Pipe. The bottom remotely controlled closed end valve will then be opened. The concrete is let to set between the pipe to pipe areas. The Re-Case Pipe (below the BOP and above the well pipe that require repair) will be uncoupled via the Coupling/De-Coupling Pipe (or will be cut and extracted).

The Re-Case Pipe (R-CP) is similar to the lowest section of the installed faulty well pipe/casing except:

Smaller in diameter.

Selected sections (the uppermost as a minimum) shall incorporate remotely monitored exterior pressure, oil, water, mud and concrete sensors.

The Bottom Kill End Pipe (BKEP) is similar to the R-CEP except:

The 'initially' closed bottom end will also have a permanently closed section above it.

The volume between the initially and permanently closed portions will contain pre-loaded 'junk', along with a remotely controlled means to open the bottom and release the 'junk'.

The 'junk' will be of various size material, flexible, buoyant (in oil) and capable of withstanding well pressures and temperatures.

Will not include the remotely controlled circular hydraulic controlled gasket around its outer circumference near the closed end, but instead will include a large expandable remotely controlled end plug (similar to an expandable pipe plug). The 'large' plug will be capable of expanding to the diameter of the well bore. The large plug will be set below the well casing and the plug would be expanded. The initially closed bottom end will be opened releasing the junk further sealing/clogging/choking the well. Mud followed by concrete would be pumped through KP in a similar manner as the Re-Case Pipe except the concrete will also flow into the well bore and the concrete will not be evacuated from the pipes interior. The upper sections of pipe will be removed in a similar manner as the Re-Case Pipe.

The Kill Pipe (KP) is similar to the R-CP except the 'selected sections'(the uppermost as a minimum) shall incorporate remotely monitored interior (as well as exterior) pressure, oil, water, mud and cement sensors.

The Modified Conversion Float Valve (MCFV) changes the release method/mechanism from the present dropped ball, semi obstructing the flow through a pipe holding the valve opened causing a delta pressure. When/if the delta pressure and flow meet a pre-selected criterion, the said pipe releases and converts the device to a one-way valve.

The modification converts the valve to an electrical remote controlled device—activating a solenoid. The opening valve will further be spring loaded and its opening will be sensed and reported and remotely monitored as flow-rate.

The Modified Casing (MC) incorporates remote controlled sidewall gate valves near the top of the casing. Although the MC is primarily intended for the lower most casing, it could be desirable for other casing sections as well. The said valves would be initially being held closed. Upon command the valves will allow one-way flow, from the pipe into the well-bore. This will allow cementing from the top of the casing to the bottom, reducing the required pressure and further provides a more positive void/bore fill.

The Modified Reamer Shoe/Drill Shaft (MRS/DS) modifications combine the functional elements of the R-CEP and the BKEP with the following alterations:

The 'large' 'plug' element of the BKEP is incorporated on the lower part of the shaft/collar slightly above the shoe or drill bit to seal/clog/choke the well bore to drill shaft/collar.

Incorporates a remotely controlled gate valve device internal to the pipe, just above the drill bit to restrict flow through the drill bit.

The remotely controlled 'o-ring' pipe to pipe sealing gasket around the pipes circumference incorporated on the R-CEP shall be re-located to above the controlled gate valve.

The intent of the MRS/DS is:

Similar to the BKEP by providing the means to kill the well below the last pipe in the well bore, but with the reamer/drill shaft in the well.

Similar to the R-CEP by providing reliable means to re-case (specifically the pipe to pipe cementing process), but with the drill shaft/collar and/or the Reamer Shoe in the well To provide improved reliable means to cement the last pipe to the well bore.

The 'Fundamental' MFWS provides maintenance access, redundancy, sea-floor pressure relief/diversion means and utilizing common unique and in-use apparatus and tools, used in conjunction with a newly devised oil well access to provide the means to:

Cap the well

Seal/re-seal the well

Drill/re-drill the well

Kill the well (at the bottom from the top)

Improve BOP(s) reliability

Improve means to end casing

The 'Advanced' MFWS includes all the features of the above, and further includes a unique dome top, cylindrical sidewall assembly/structure enclosing the well's sea-floor equipment providing improved structural strength and protection from natural/human induced disasters.

Either the Fundamental or Advanced MFWS configurations could be modified to include an additional Adjunctive BOP/Access Valve Assembly (AVA) installed below the BOP providing further redundancy.

MFWS Detail Design Notes/Information

The dome's size is determined by the wells characteristics. The primary factor is the height of the wells above sea-floor equipment (Marine Riser and BOP and newly installed adaptors/assemblies—OPA, PMA, and AVA and P-WIA) followed by the margin of safety associated with the:

The lateral stability of the DA (diameter to height ratio).

The sidewall strength beyond that required to support the top members—where the 'beyond' is the strength to compensate for falling objects/underwater blasts The height and width of the required maintenance area (ROV workspace) The overall 'Dome Assembly' size shall be as small as possible but its sidewall height shall be greater than the existing wells sea-floor equipment (Marine Riser and BOP—(generic/ball-park height>60'). The sidewall diameter will provide lateral stability of the Dome Assembly and have a surface area compatible with all required dome top ports. (>two third the height, generic/ball-park diameter>40') The initial (pre-cementing) weight of the Dome Assembly shall be slightly greater than the weight to sink it to the sea-floor, But if prior to its installation, the well head is opened and under pressure and can not be controlled/stopped, then weight must be added to overcome the well pressure. The added weight shall be determined assuming all top ports/valves opened (the said ports/valves would be opened during the normal installation/setting process). The top domed member (dome top and interior plate forming the reservoir) shall be made of material and joined in a manner to withstand greater than two times the wells' anticipated pressure. The cylindrical sidewall of the dome is fabricated with material and supporting braces capable of supporting the top (domed) structure and act as a concrete form to structurally connect the dome top section to a concrete floor pad. The center interior will include installation positioning/guide braces about the locations of Marine Riser, BOP and BOP Output Pipe Adaptor. The sidewall may be made of two or more vertical separable sections enabling sea-floor equipment changes for the completion-production phases (if/as desired). The exterior of the sidewalls will include a minimum of three horizontally extending 'L' brackets. The brackets will support remotely controlled leveling jacks capable of lifting/leveling the pre cemented Dome Assembly. The dome top to sidewall mechanical interface shall include lifting hooks/eye-bolts and shall be capable of supporting the DA's initial (pre-cemented) weight. After the DA is set (positioned and leveled) on the sea-floor, pressure relief vent pipes (approximately 3-4 feet long) vertically set in the sea-floor having the vent pipes be semi-evenly spaced in the floor and encompassing an area approximately five percent of the total sea-floor area, and a concrete floor (approximately 3 feet deep) will be poured (structurally connecting the Well Stud to the sidewall). The cylindrical sidewall will include an opening the size compatible with passing through a 'typical' off-shore oil well's ROV. The opening will be enclosed by a door. The door will include pressure relief/venting means allowing higher internal pressure to be released, while sealing the interior from higher external pressure. The center of the dome top will house a large access port. 'Large' is defined as the area capable of passing through a device the size of an ROV. The port will be initially used to access the interior of the dome during installation and latter for repair/replacement on assemblies within the dome. The exterior of this port area will include guide-pins and bolt studs to mechanically secure an Access Port Adaptor (APA). The APA reduces the port size and is used to connect various assemblies/adaptors for well pipe drilling, sealing repair and abandonment processes (killing), Off-center of the access port will include several production sized ports. The exterior of these ports will include the means to secure a Pressure Relief/Diversion Valve, Production Valves or Production Hard Caps. These mounting elements (pins and bolt studs) shall be identical (size, spacing and pattern) on all Production Ports. These ports/valves will be initially opened (as well as the Access Port) during the Dome Assembly (DA) installation (lowering and positioning). The ports/valves are initially used for pressure relief/venting and latter used for production—or will be capped. The Dome Assembly will include numerous standard (non-unique) remotely monitored/controlled equipment such as:

Levels.
Internal and external closed circuit T.V. (s) and associated lights.
Pressure sensors.
Oil, water and gas detectors All assemblies/adaptors/tools shall include the following where applicable: Be made of material capable of withstanding greater than twice the well's pressure Supporting means compatible with lifting, lowering and positioning the unit from the surface platform and ROV(s) Top and bottom mounting surfaces' compatible (size and shape) with the units they physically interface with Top and bottom mounting hardware (bolt studs, guide-pins) and compatible (size and pattern) holes and captivated securing components with the units they physically interface with:

Mounted gaskets compatible with the size and shape of the unit and the unit it physically interface with
The means to remotely remove and replace all internal functional elements by a ROV(s)
Remotely controllable devices shall be designed using electrical, fiber-optics, mechanical, hydraulic and/or pneumatic means with connections compatible with a ROV(s) capability to install/remove.

There are many different 'working' pipe sizes and the expandable seals of the P-WIA will likely not be capable of handling, therefore different sized P-WIA s' or inserts must be provided.

Varying levels of pressure could be applied to the P-WIA's seals allowing for a fully opened, to fully a hard sealed, as well as intermediate levels allowing for rotating and vertical pipe movement as well as sequencing the said pressure from the upper & lower seals as the pipe joints pass thru the unit.

The functionally/performance of numerous MFWS unique equipment/tools require or would be enhanced with the addition of an 'in-well' monitoring & control interface. Numerous interface structures could be employed to provide this function. Although the intent of this document is to provided a 'system level' design the following is provided as design information/specifications/requirements for this interface as follows:

Design. The enabling interface design of the monitoring and control subsystem is proposed as two unique alternatives. The first being an attached/embedded fiber-optic cable in/on the drill pipes sidewall and the second is an attached/embedded data cable in/on the casing pipes sidewall.

Embedded Fiber-Optic (FO) cable within the drill pipe sidewall.
Compression pipe to pipe FO connections.
Directly connect sensors and controlled devices attached to the drill pipe to the said cable.
Sensors and controlled devices not directly attached to the drill pipe interface via non-physical contact means of coded Light/IR/RF and/or acoustic interface devices (such as a garage door opener or 'Easy-Pass' type device).
Sensor and controlled devices powered by batteries.
Controlled devices using hydraulics would use battery power to activate (in-well) pumps with initial pressure equalization means.

Notes/Requirements:
The FO bandwidth is orders of magnitude greater than required (but provides a convenient bi-directional capability)
The sensors will include addresses (digital/frequency codes) capable of any future conceivable need.
The following define the minimum required simultaneous functionally, which basically defines/limits the requirements of the controlling/monitoring unit.
25 discretes—yes/no (such as sensed gas)
15 levels indicators with ten to the $5^{th}$ dynamic range (such as well pressure)
15 controls (such as turn on/off)
15 control status/feedback.

Embedded data cable in/on the casing pipes side wall further incorporates a transmitter/receiver interface device that communicates via electrical contact, fiber-optics and/or acoustics to similar receiver/transmitter devices on the drill pipe and/or to lower sections of casing pipes.

The receiver/transmitter device(s) on the drill pipe connect (via conditioning/formatting circuits) to sensors/control devices in/on the drill pipe.

Sensor devices in/on the drill pipe that provide significant data may further include electronic circuits to store the data, compression the data and the means to transmit the data at a modified/lower data rate.

The sequence of operations of the Pipe Cutter Mechanism will be initiated by an operator at the Remote Monitor and Control Unit (RM&CU). In the automatic operational mode, after being 'initiated', an embedded micro-processor and program in the RM&CU will control and perform the cutting process described below. In a manual mode the operator will perform the steps below:

1. An operator at the RM&CU will initiate a pipe cut defining a given size pipe.
2. The Circular Saws and Lateral Drive Devices drives, with minimum torque contacts the pipe to confirm the designated pipe size. If different informs the operator.
3. If the pipe designated is confirmed the proper size, the saw motors are turned on and laterally driven into the pipe until either the thickness of the pipe-wall is penetrated or the saw motor speed decreases greater than 20%. If the latter occurs see * (below).
4. When the pipe-wall is penetrated, the Turn-Table Motor turns on and continues to cut the pipe until either the Turn-Table turns to where the pipe is cut by each saw 110 degrees or the saw motor speed decreases greater than 20%. If the latter occurs see * (below).
5. When three saws have cut the pipe 110 degrees, Circular Saws and Lateral Drive Devices retract the saw blades and: The Turn-Table is positioned at 120 degrees.
6. The Wedges' Lateral Drive Devices is activated pressing the wedges into the pipe cut.
7. The Circular Saws' Lateral Drive Devices is again activated to drive the saw blade towards the pipe until either the thickness of the pipe-wall is penetrated and the pipe is fully cut or the saw motor speed decreases greater than 20%. If the latter occurs see * (below).
8. Once the pipe is fully cut it must be extracted. If another pipe needs to be cut, the first pipe must be pulled clear of the pipe cutting lateral drive mechanism. *If any of the saws speed decreases greater than 20% from its unloaded speed, the appropriate drives will be backed-off until the no-load speed is obtained. The drives will then proceed to the continuing cutting process.

The objective of the Intrusion Detection and Response Subsystem (ID&RS) is to protect the surface and underwater oil well elements from deliberate human intervention. It is assumed a 3D restrictive zone will be established about an individual or group of oil wells.

The ID&RS provides the means to detect, track and classify the 3D aspects (bearing, range, and depth) of air/surface/sub-surface objects about a specific oil well or group of oil wells. It also provides the means to evaluate potential threats and 'Hard and/or Soft Kill' threats.

The ID&RS elements are identified in four categories as follows:

1. Major existing military type platform equipment that provides short range AAW, ASUW and ASW capability including such items as:
Radars (search and fire control).
IFF
ESM
Sonar
Active and Passive Decoys (Acoustic, RF and IR).
Hard Kill Weapons (guns, missiles, torpedoes and depth charges).
2. Major existing military/commercial type equipment such as:
LAMPS Helicopter
ROV s
3. Unique equipment such as:
Array(s) of sea surface tethered remotely controlled RF and IR generators/decoys.
Array(s) of below sea tethered remotely monitored Passive Acoustic Sensors (PAS) and a platform mounted PAS.
Remotely controlled acoustic generators/decoys and remotely controlled acoustic corner reflectors.
Interface, Processing and Display Monitor and Control.
4. Trained Operator(s).

Many of the terms such as 'short range' and 'weapons' are quite subjective and since the primary threat is considered to be quite rudimentary the following are identified as design guidance:

A Radar (search, fire control and integrated IFF) capability such as the MK92 CAS.

Weapons such as the Standard Missile, Harpoon and Mk46 Torpedoes would work but have a significant over kill for the anticipated threat.

Hard Kill weapons could include such items as a MK15 CIWS, a 3" gun, SUBROC and Helicopter launched depth charges and shoulder type fire and forget anti-air and anti-surface missiles.

ID&RS Detail Design Notes/Information

The acoustic sensors and arrays are conceptually based on USN ASUW and ASW detection and processing techniques. The subsurface piggy-back depth angle sensor and the related arrays depth determination is unique but based on the triangular processing of the bearing and range. It is anticipated the sensed 'depth angle' will be compromised by sea-floor and surface reflections/bounce, but it is assumed that integrating over time and averaging the three differently located sensors data will provide tangible results. The tracking, classification, threat analysis and threat response recommendations are also based on USN processing.

The RF, IR and acoustic generators and corner reflector (s), and their associated array, are conceptually based on USAF and USN air tactical counter-measures (stand-off jammers and gate stealers) and USN submarine counter-measures (decoys).

The Light Airborne Multi-Purpose System (LAMPS) operations are based on the USN LAMPS MK111 ASW and ASUW techniques.

The following describe a single well installation utilizing a USN or USCG Ship for the 'Major existing military type platform equipment that provides short range AAW, ASUW and ASW capability'.

It is assumed alternative interfaces, operations and array configurations could be derived for well platform based equipment and/or multiple well implementations.

The Radar and associated IFF and Electromagnet (passive detection) Sensor (EMS) are the 'eyes' for above the surface, while the passive acoustic sensors are the 'eyes' for below the surface.

The acoustic sensor array provides subsurface and surface detection data and the means required to triangulate the sensors detections to determine Bearing, Range and Depth.

The outputs of the acoustic sensors* and control signals for all generators (RF, IR and acoustical) interface with (via cable) an Array Distribution Unit (ADU). The ADU (data/controls) interfaces (via cable) with to the Data and Signal Formatter (D&SF). D&/SF on a (oil well) platform digitizes and serializes the signals. The digitized and serialized signal is sent to the platforms RF Data Link and then the ship's RF Data Link. The data is then sent to the Processor where is processed for display monitoring and display interface, detection support (bearing, range and depth determination for acoustic contacts) and tracking, classification, threat analysis and related recommendations, as well as historical storage for air, surface and subsurface contacts.

The processed data and information is then sent to the Display Monitor and Control Unit. A trained Operator views/reviews the data and information and determines and initiates appropriate actions.

The processing will include an operator selectable auto threat-quick reaction 'soft-kill'/decoy mode, allowing the program to automatically control the RF, IR, acoustical generators and corner reflectors.

The controls are sent to the appropriate selected unit(s) (specific sensor and/or generator) via the Processor, RF Data Link, Data Formatter, Array Distribution Unit and then to the appropriate unit. LAMPS Helicopter interfaces via its own data link.

If ROV actions are required, a stand alone interface, monitor and control system identical to the existing ROV's will be used.

If the Ship has a sonobuoy receiver system compatible with the number and type of sonobuoys in the array the sensors could directly (via RF) interface with the ship.

It is assumed the sensor (RADAR, IFF, and ESM etc.) and weapons on a USN or USCG Ship identified as short range AAW, ASUW and ASW capable would well serve this mission, particularly as supplemented.

The RF and IR Generators/Decoys are standard simplistic active noise or repeater source similar to numerous such devices used by the USN and USAF. The device shall be externally stimulated and controlled by the Processor to produce outputs capable of:

Being totally silent.

Producing broadband continuous wave frequencies over the entire spectrum of anticipated homing devices, at power levels greater than the anticipated homing device's transmitter.

Producing a controlled variable delayed pulsed repeater outputs compatible with the pulse-width and spectrum of an anticipated active pulsed homing device. The controlled variable delay shall have a minimum range from; <1 us to greater than 10 ms. The repeater will further have controlled power levels from a maximum equaling the anticipated power of a homing device's transmitter, to minimum power level of zero.

The Passive Acoustic Sensor (PAS) is derived from a modification of the standard AN/SSQ 53 Directional Frequency Analysis and Recording (DIFAR) Sonobuoy.

The low-tech modifications include:

Providing an external power source via cable (vs. internal battery power).

Removing the antenna output interface and utilize output via cable interface format.

Mounting two unit's piggy back on different axis (one producing bearing angle and the other depth angle).

Increase buoyancy to insure unit with attached cable (and attached Acoustic Generator has significant positive buoyancy.

The Acoustic Generator (AG) is a simplistic active acoustic noise source similar to numerous such devices used by the USN.

The device shall be externally stimulated and controlled by the Processor to produce outputs capable of:

Being totally silent.

Emulating the acoustic signature of an oil well's sea-floor and platform, with power levels equal to ten times the said well.

Producing broadband continuous wave acoustic frequencies over the entire spectrum of anticipated homing devices, at power levels greater than an anticipated homing device's transmitter.

Producing a controlled variable delayed pulsed repeater output compatible with the pulse-width and spectrum of an anticipated active pulsed homing device. The controlled variable delay shall have a minimum range from; less than 10 us to greater than 10 ms. The repeater will further have controlled power levels from a maximum equaling the anticipated power of a homing device's transmitter, to a minimum power level of zero.

The Acoustic Corner Reflector (ACR) is a simplistic passive decoy type device. It is basically composed of two flat acoustical reflective crossing plains (crossing in the center) at 90 degrees that reflects an acoustical signal back in the same angle it was received. The ACR further includes a remote controlled element that rotates (from the center) one of the plains to form a dual flat surface. The ACR is deployed with weighs on the sea-floor and/or tethered at different depths.

The PAS and AG units will be connected (via cable or be physically joined) and typically deployed in functional sets of three or four typically @ equal distance from each other and equal distance about a specific well (or in other functional sets about a group of wells).

Each of the PAS, AG and/or ACR units will be tethered from the sea-floor to predetermined depths. The RF & IR generators will be tethered to the sea surface.

The said tethered cables could include various combinations of sensors/decoys. The sea-floor will hold the tethered cable with weights capable of insuring it does not change its position (depth, lat. and long.). The cable length from the tethered weight to the sea-floor to platform shall be the planned distance plus about one and a half times the sea depth (for future recovery/maintenance). A single (non-joined) AG will be mounted on the underside of the surface platform providing the means to calculate (via the processor) the exact position and aspect of the joined PAS and AG devices.

The ROV(s) is identical to such devices used by the oil industry for deep off-shore drilling but this unit's interface cables will be lengthened so it can travel greater than two miles from the platform. The ROV(s) provide the means to view, evaluate and move delayed fused under-sea explosives.

The Array Distribution Unit (ADU) function only acts as a convenient physical wire/cable distribution center.

The Data and Signal Formatter (D&SF) is an active electronic data and signal formatting device located on the platform.

The 'formatting includes:

Analogue to Digital conversion

Digital to Analogue conversion

Multiplexing and De-multiplexing into and from a single serial digital data interface cable. The D&SF will have the minimum through-put capacity (bandwidth) to simultaneously handle:

From Sensors:

Acoustic outputs of eight type AN/SSQ-53 Sonobuoys.

Plus 50% (control, feedback, status, etc.).

To Sensors and Generators:

Approximately 25% of the 'from sensors' bandwidth

It is assumed devices matching/exceeding these requirements are available 'off-the shelf' (from Industry/US Government). The RF Data Link is a common device used by industry and the government. The device converts serial (cable media) electronic data/signals to RF for transmission to another location via an antenna and likewise receives RF and converts it to serial electronic data/signals.

The capacity (bandwidth) must be compatible with the required data/signals of the system, as identified for the D&SF.

It is assumed devices matching/exceeding these requirements are available 'off-the shelf' (from Industry/US Government).

*The above assumes a separate in-place ship to helicopter (LAMPS) data link.

The Processor includes a computer and specialized computer programs. The Processor provides critical functions related to the surface/sub-subsurface objects:

Detection
Position
Tracking
Classification
Threat Analysis
Related recommendations The processor also provides interface for the Display Monitor and Control Unit. The processor further provides for sensor position and aspect calibration, operator training via simulation and historical operational recording.

It is assumed the computers are in-place on the ship, or a computer matching/exceeding the required process capacity and speed are available 'off-the shelf' commercially.

The 'specialized computer programs would have to be developed, but the USN utilizes similar functional software for their AAW, ASUW and ASW mission. If such were made available the development (time, cost and risk) would be reduced by an order of magnitude.

The Display Monitor and Control Unit (DM&CU) provides for the operator to system interface.

The Light Airborne Multi-Purpose System (LAMPS) is identical to that used by the USN for surface and sub-surface detection, localization and engagements.

Although specific operational displays, modes, functions or controls are not specified in detail at this time, it is assumed the DM&CU is in-place on the ship or a unit matching/exceeding the requirements is commercially available—large touch-screen monitor would well serve the all requirements.

It is understood that the preceding description is given merely by way of illustration and not in limitation of the invention and that various modifications may be made thereto without departing from the spirit of the invention as claimed.

The invention claimed is:

1. An in-well monitoring and control bi-directional communication interface subsystem incorporating: a fiber-optic conductor data cable affixed or embedded along the length of a drill pipe having a pin and box connection and, an external sidewall data pipe to pipe coupling device; wherein each of the two ends of the drill pipe's data cable penetrate the drill pipe's exterior sidewall prior to the pipes pin and box ends; wherein the data cable's conductor is exposed at the drill pipes exterior sidewall; wherein the external sidewall pipe to pipe coupling device incorporates a mechanical assembly and a data cable: wherein the mechanical assembly incorporates two half cylindrical shape elements having a length that extends beyond the exposed conductor ends of the drill pipe; wherein the two half cylindrical elements shape elements further incorporate mechanical joining elements; wherein, the two cylindrical elements form a sleeve around the exterior of the drill pipe; wherein a data cable conductor is incorporated in the interior of one or both of the cylinder shaped elements: wherein both conductive ends of the data cable within the external sidewall data pipe to pipe coupling device are connected; wherein both conductive ends of the drill pipes data cable, and both conductive ends of the external sidewall data pipe to pipe coupling device data cable physically contact each other.

2. The in-well monitoring and control bi-direction communications interface subsystem of claim 1 further including one or more data cable splitter(s) in or on selected drill pipe sections.

3. The in-well monitoring and control bi-direction communications interface subsystem of claim 2 further including redundant pipe to pipe data cable coupling, wherein the redundant pipe to pipe coupling utilizes a split conductor from the drill pipe data cable splitter that extends to and terminates at the exposed ends of the drill pipe within the pin and box ends of the drill pipe, wherein physical contact is made between the conductive element of the two adjoining drill pipe conductors when the pipes are mechanically joined together.

4. The in-well monitoring and control bi-direction communications interface subsystem of claim 2 further including one or more in-well sensors or in-well control devices,
wherein the in-well sensor or in-well controlled device utilizes a split conductor from the drill pipe data cable splitter that extends to and terminates at the sensor or controlled device.

5. The in-well monitoring and control bi-direction communications interface subsystem of claim 4 further incorporating a processing device wherein the processing device monitors one or more sensors or the operational mode of one or more control devices, analyzes the data and generates alerts, recommendations or automatically commands the mode of one or more controlled device.

6. The in-well monitoring and control bi-direction communications interface subsystem of claim 4 further incorporating an external interface device wherein the external interface device formats input and output data to or from external sources.

7. The in-well monitoring and control bi-direction communications interface subsystem of claim 4 further incorporating one or more controlled drill pipe liquid or gas flow in-well controlled device.

8. The in-well monitoring and control bi-direction communications interface subsystem of claim 1 further incorporating a line driver/amplifying device within the external sidewall data pipe to pipe coupling device.

9. The in-well monitoring and control bi-direction communications interface subsystem of claim 1 further incorporating a wireless data link interface.

* * * * *